United States Patent
Pettersen

(10) Patent No.: US 6,826,594 B1
(45) Date of Patent: Nov. 30, 2004

(54) METHOD AND SYSTEM FOR REMOTE CONTENT MANAGEMENT OF A DESIGNATED PORTION OF A WEB PAGE

(75) Inventor: Per Pettersen, Santa Barbara, CA (US)

(73) Assignee: Commission Junction, Santa Barbara, CA (US)

( * ) Notice: Subject to any disclaimer, the term of this patent is extended or adjusted under 35 U.S.C. 154(b) by 635 days.

(21) Appl. No.: 09/617,061

(22) Filed: Jul. 15, 2000

(51) Int. Cl.[7] .............................................. G06F 15/16
(52) U.S. Cl. ...................... 709/203; 709/219; 709/225; 705/26; 705/59
(58) Field of Search ................................ 709/203, 225, 709/219; 715/501.1, 517; 705/26, 59

(56) References Cited

U.S. PATENT DOCUMENTS

| | | | | |
|---|---|---|---|---|
| 5,835,712 A | * | 11/1998 | DuFresne | 709/203 |
| 5,987,480 A | * | 11/1999 | Donohue et al. | 715/501.1 |
| 6,055,522 A | * | 4/2000 | Krishna et al. | 715/517 |
| 6,073,124 A | | 6/2000 | Krishnan et al. | |
| 6,076,071 A | | 6/2000 | Freeny, Jr. | |
| 6,112,242 A | * | 8/2000 | Jois et al. | 709/225 |
| 6,484,149 B1 | | 11/2002 | Jammes et al. | |
| 6,629,135 B1 | | 9/2003 | Ross, Jr. et al. | |

FOREIGN PATENT DOCUMENTS

| | | |
|---|---|---|
| WO | WO 94/27222 | 11/1994 |
| WO | WO 98/58334 | 12/1998 |
| WO | WO 99/50771 | 10/1999 |
| WO | WO 00/08802 | 2/2000 |
| WO | WO 00/23909 | 4/2000 |
| WO | WO 00/23928 | 4/2000 |
| WO | WO 00/23929 | 4/2000 |

* cited by examiner

*Primary Examiner*—Wen-Tai Lin
(74) *Attorney, Agent, or Firm*—Morrison & Foerster LLP

(57) ABSTRACT

A method for inserting a dynamic content into a web page uses a dynamic content code embedded in the web page. The dynamic content code is used to access a program file on a dynamic content host computer that is run to generate the dynamic content based upon a identification code. The look and behavior of the dynamic content is defined by a plurality of content display attributes that can be modified. The dynamic content can be varied according to a content modification level and can include a run-time modified content. The dynamic content can occupy a portion of the web page, or constitute the entire page. Multiple dynamic contents can be included within a single web page, and one dynamic content code can be embedded in multiple web pages. The dynamic content code can contain potential revenue links, and such links can be dynamically updated.

12 Claims, 20 Drawing Sheets

FIG. 4

| AD ID 250 | DESTINATION URL 248 | URL AVAILABLE 246 | ALLOW URL PASS 244 | BANNER DATA 242 |
|---|---|---|---|---|
| AID 1 | http://www.destination1.com | Y | N | 20097.gif |
| AID 2 | http://www.destination2.com | N | Y | 12345.gif |
| AID 3 | http://www.destination3.com | Y | N | 54321.gif |
| AID ... | ... | ... | ... | ... |
| AID N | http://www.destinationN.com | N | N | NNNN.gif |

240

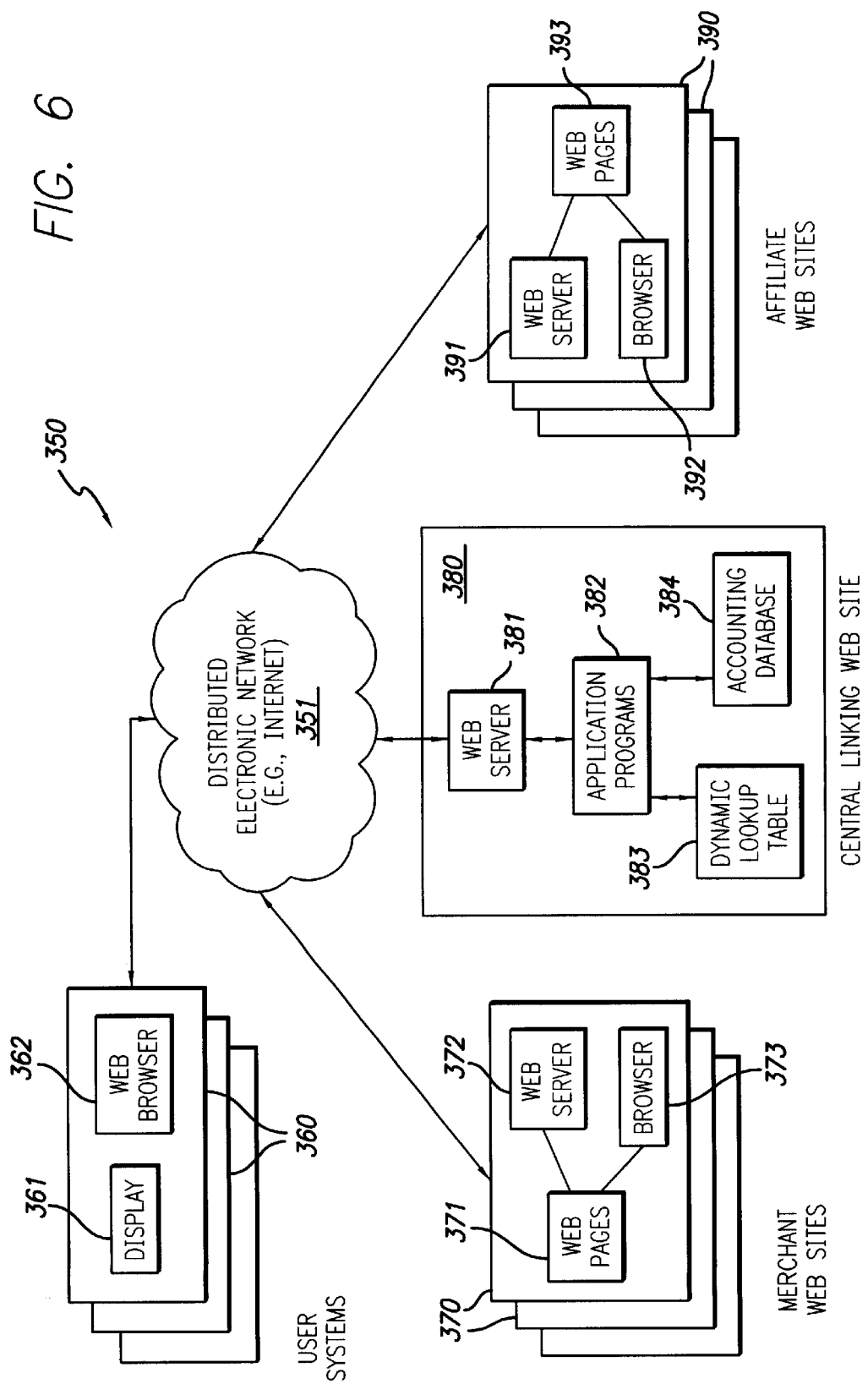

| TYPICAL IMPRESSION LINK FLOW | ENTER USER WEB PAGE | CALL STATIC LINK | RUN TRACK.EXE | RETURN BANNER IMAGE |
|---|---|---|---|---|
| VIEWER BROWSER | 1 | | | 4 |
| USER WEB PAGE | | 2 | | |
| TRACKING WEB SERVER | | | 3 | |

FIG. 7A
*PRIOR ART*

| TYPICAL CLICK-THROUGH LINK FLOW | ENTER USER WEB PAGE | CALL STATIC LINK | RUN TRACK.DLL | REDIRECT TO DESTINATION |
|---|---|---|---|---|
| VIEWER BROWSER | 1 | | | 4 |
| USER WEB PAGE | | 2 | | |
| TRACKING WEB SERVER | | | 3 | |

LOOKUP TABLE IMPRESSION FLOW

| | ENTER USER WEB PAGE | CALL STATIC LINK | RUN TRACK.EXE | TABLE LOOKUP | RETURN BANNER IMAGE |
|---|---|---|---|---|---|
| VIEWER BROWSER | 1 | | | | |
| USER WEB PAGE | | 2 | | | 5 |
| TRACKING WEB SERVER | | | 3 | 4 | |

FIG. 7D

LOOKUP TABLE CLICK-THROUGH FLOW

| | ENTER USER WEB PAGE | CALL STATIC LINK | RUN TRACK.DLL | AVAILABLE CHECK | ALLOW URL PASS CHECK | DESTINATION URL LOOKUP | REDIRECT TO DESTINATION |
|---|---|---|---|---|---|---|---|
| VIEWER BROWSER | 1 | | | | | | 7 |
| USER WEB PAGE | | 2 | | | | | |
| TRACKING WEB SERVER | | | 3 | TERMINATE IF FALSE 4 | 5 | 6 | |

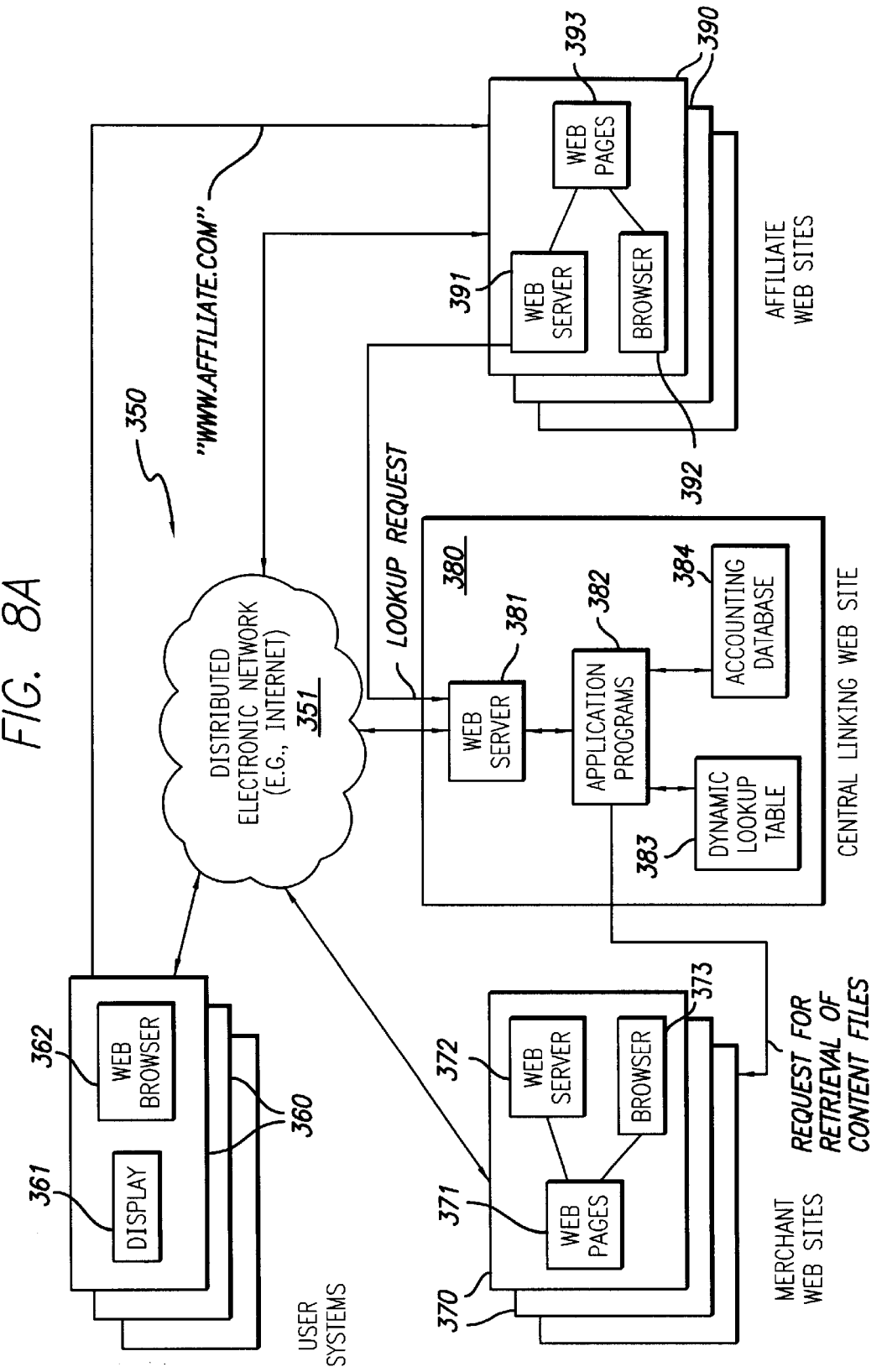

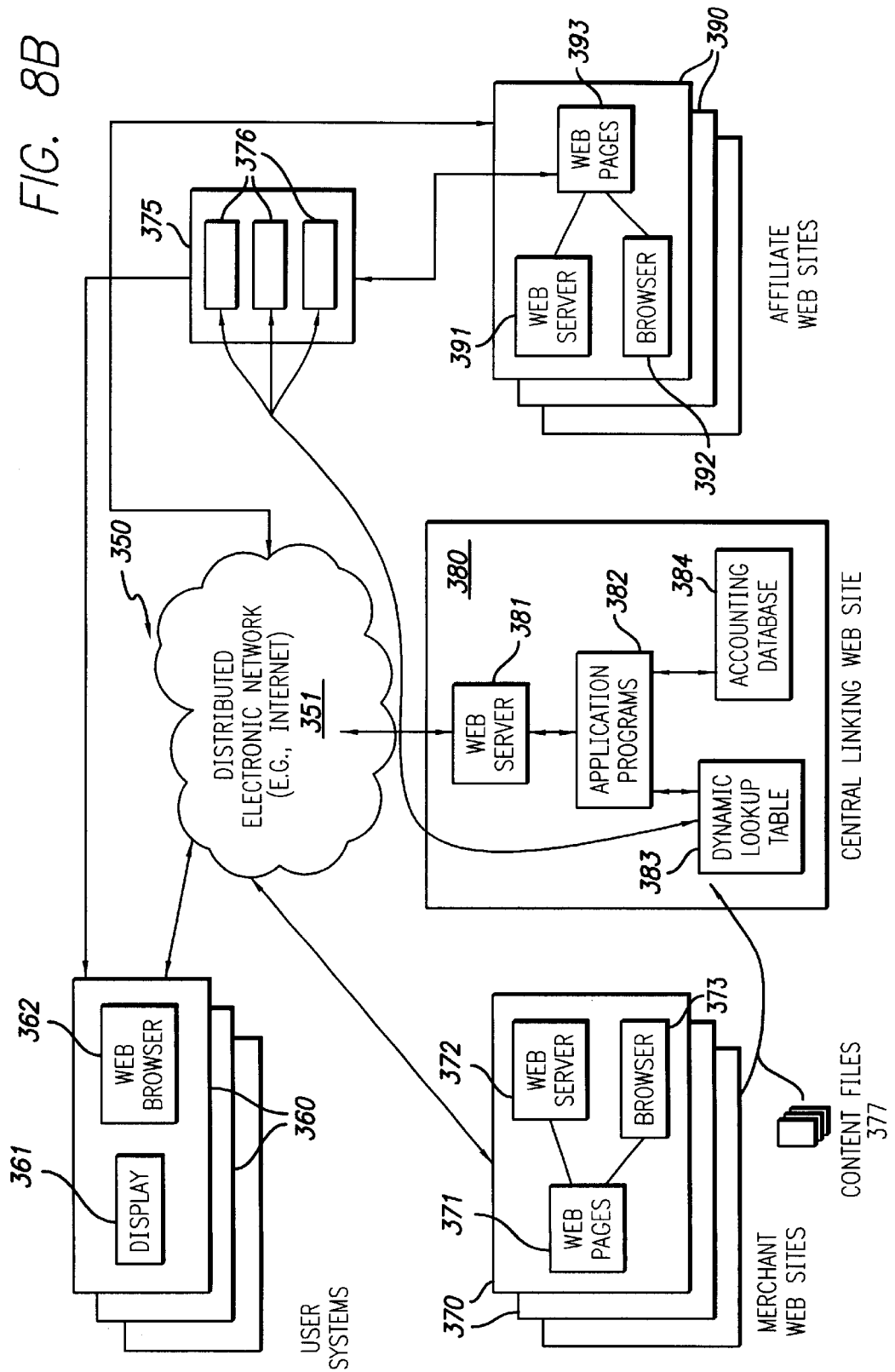

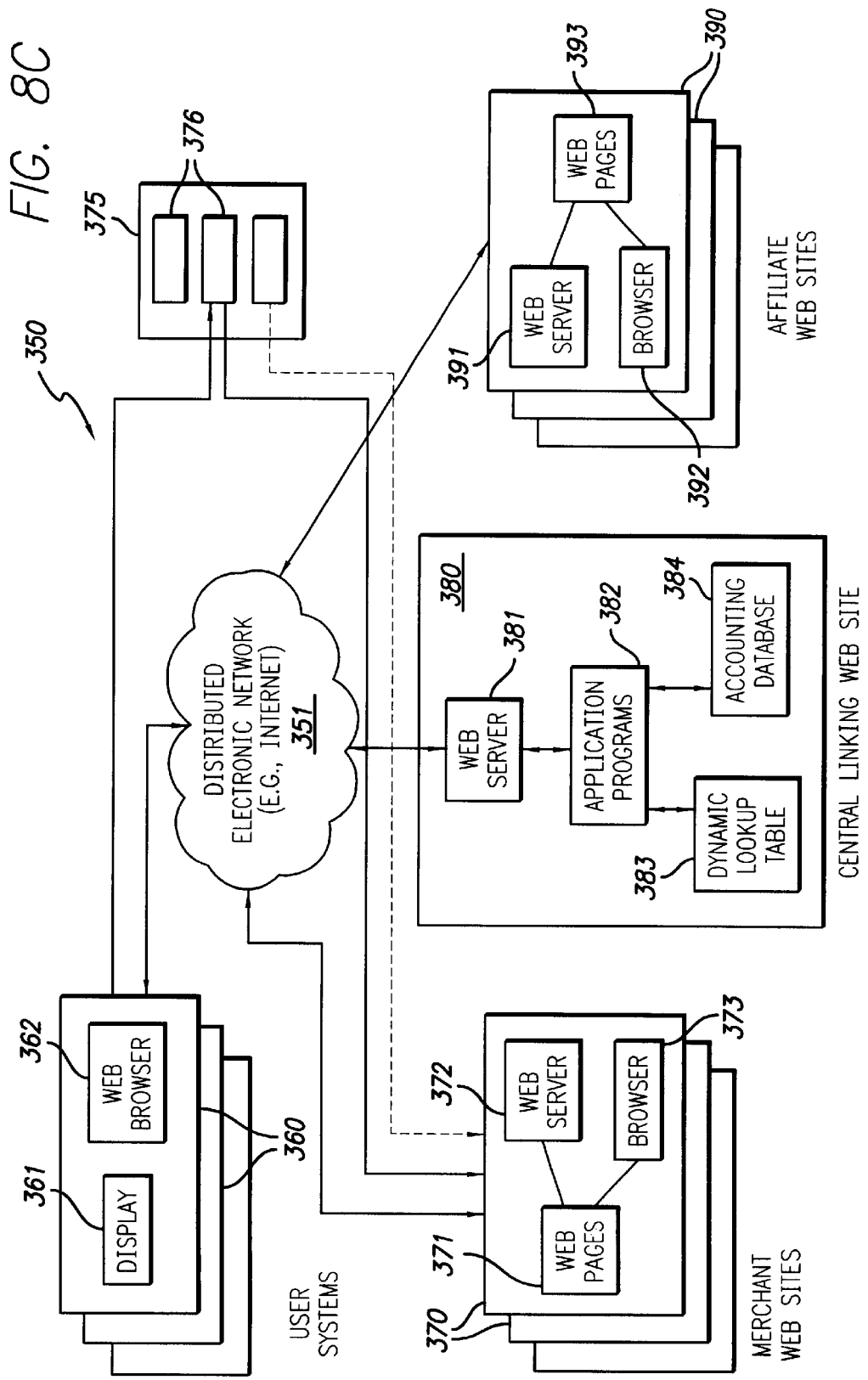

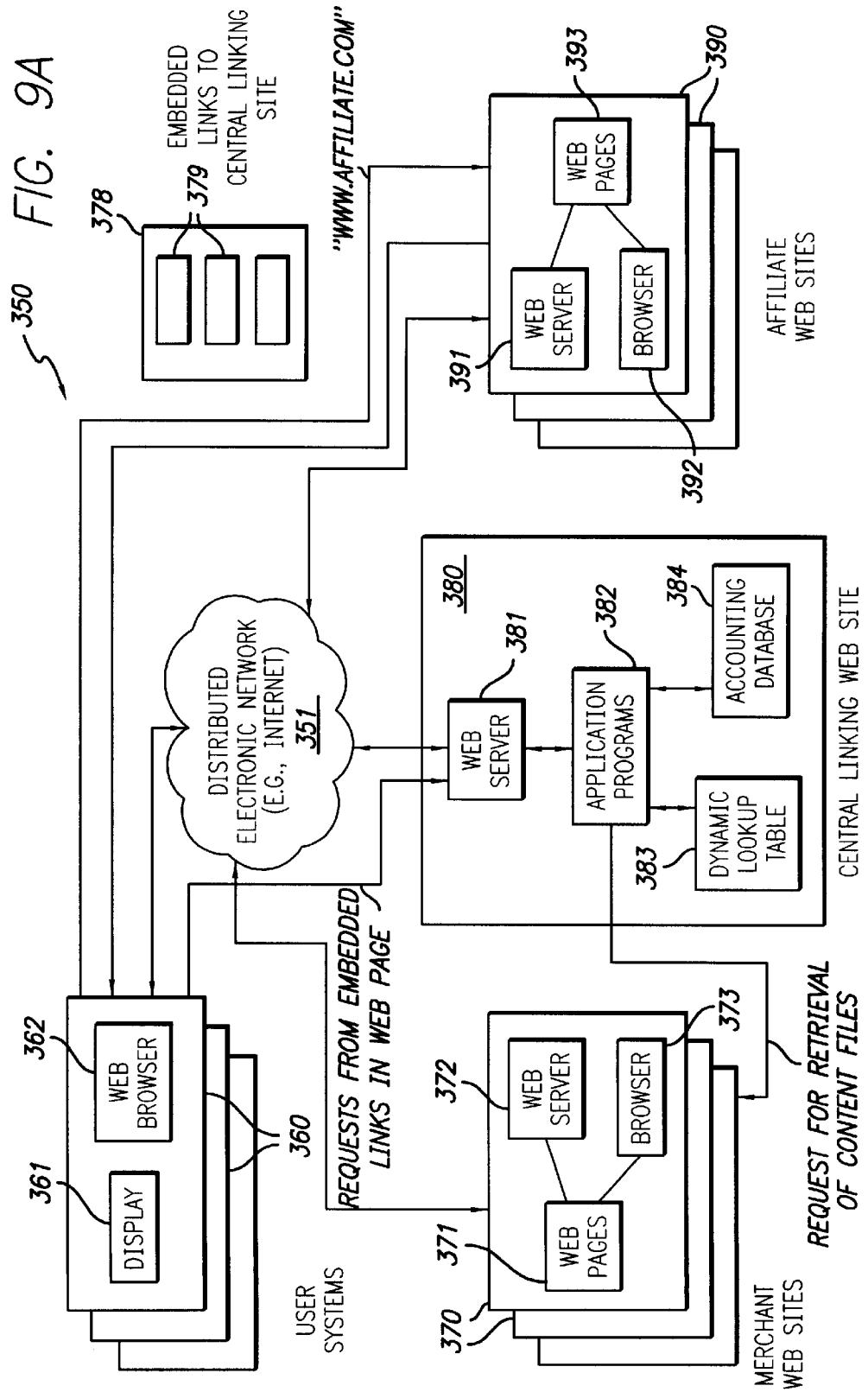

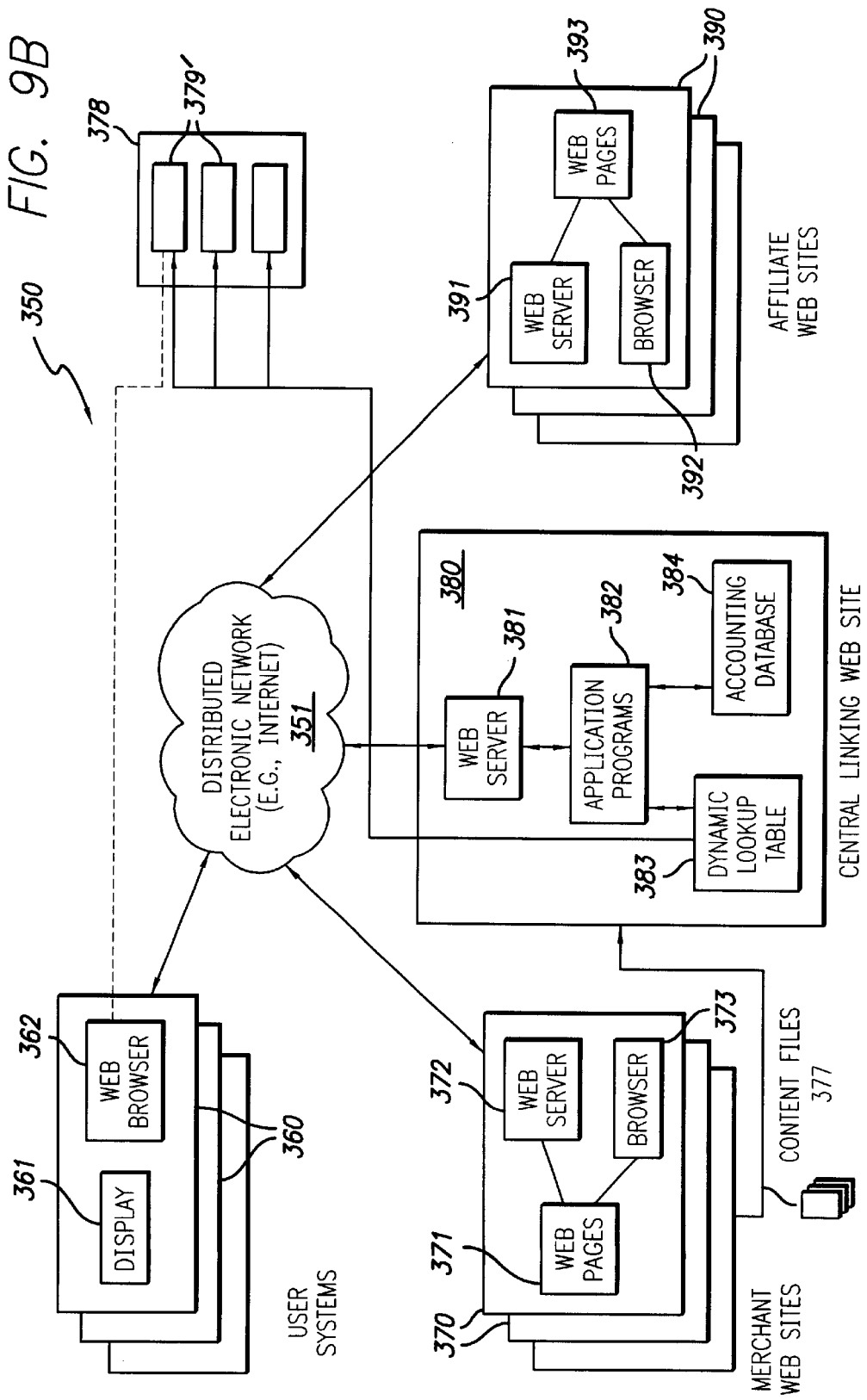

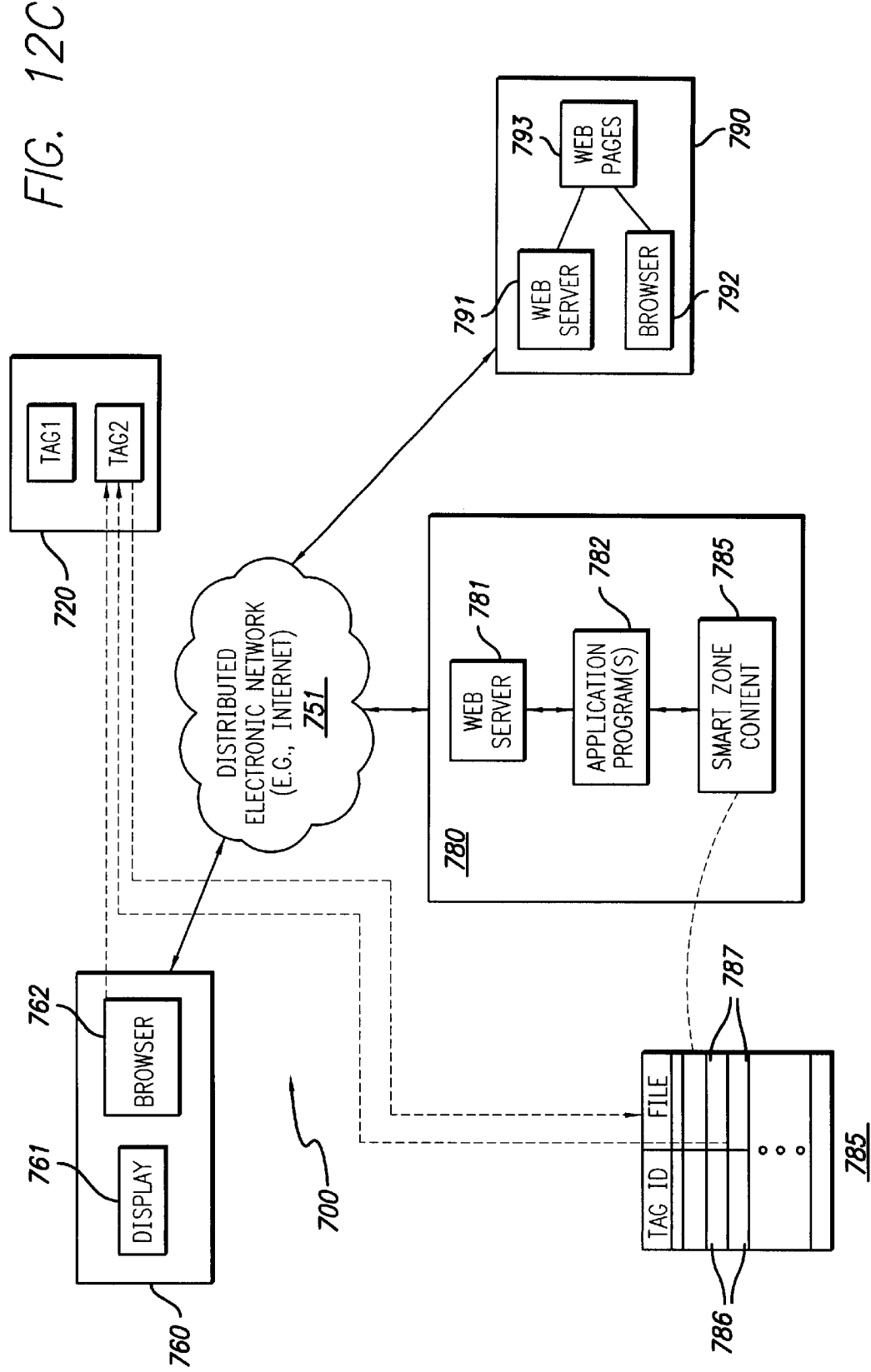

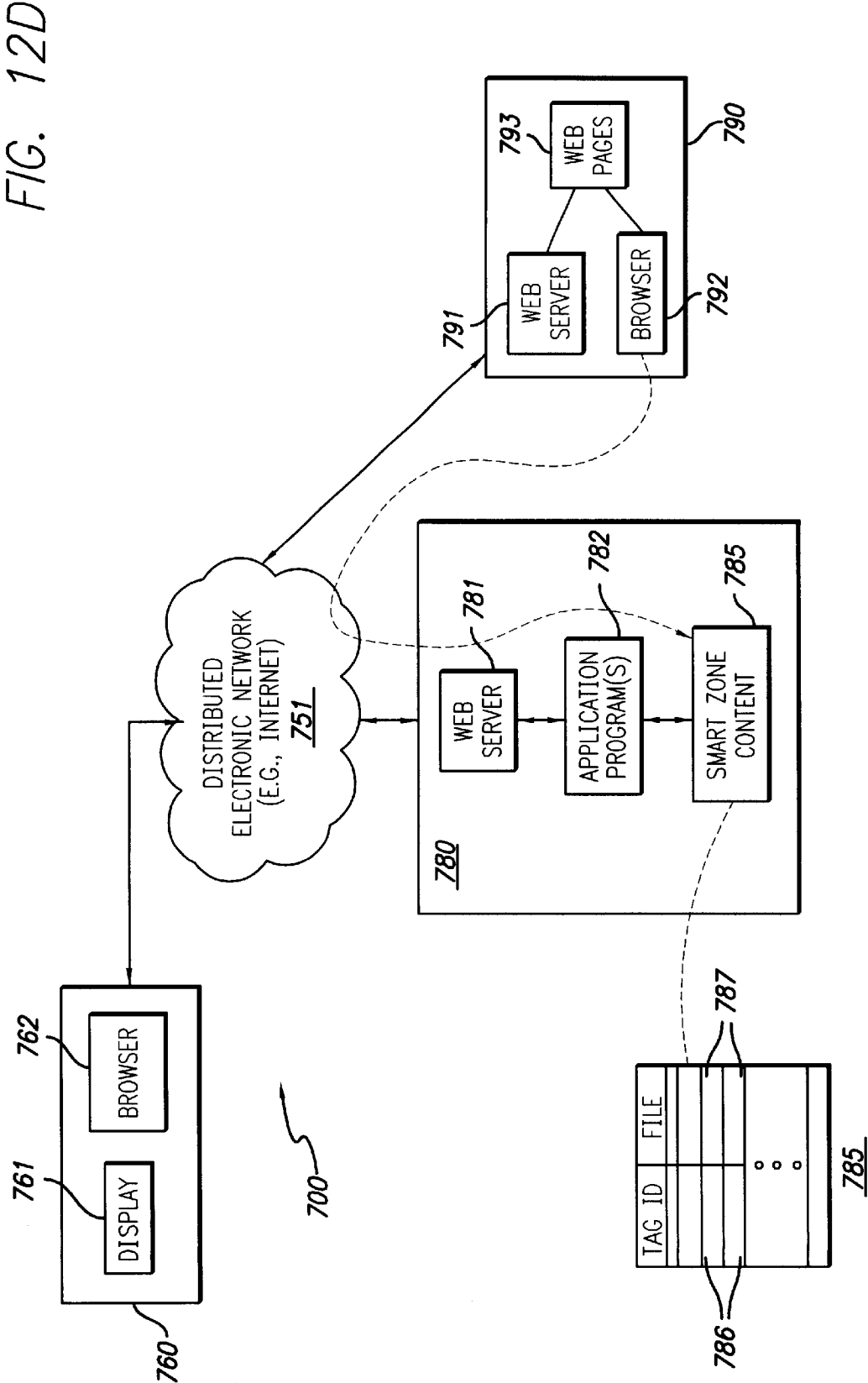

METHOD AND SYSTEM FOR REMOTE CONTENT MANAGEMENT OF A DESIGNATED PORTION OF A WEB PAGE

RELATED APPLICATION INFORMATION

This application is related to U.S. patent Ser. Nos. 09/617,060 (titled "Method for Establishing Potential Revenue Links to A Merchant Web Site within An Affiliate Web Page"), Ser. No. 09/617,062 (titled "Method And System for Facilitating Creation And Operation of A Virtual Store"), Ser. No. 09/617,055 (titled "Method for Selection of Affiliate Revenue Links from A Merchant Database through Utilization of Historical Performance"), Ser. No. 09/617,058 (titled "Method And System for Hyperlink Code Compression"), now abandoned, and Ser. No. 09/617,063 (titled "Method for Dynamically Determining A Destination Link from A Code Link Embedded within A Web Page, now abandoned), each filed concurrently herewith Jul. 15, 2000, and each of which is hereby incorporated by references as if set forth fully herein.

BACKGROUND OF THE INVENTION

1. Field of the Invention

The field of the present invention relates to electronic commerce and, more particularly, to systems and methods for dynamic construction of a web page via electronic links over a global electronic network, such as the Internet.

2. Background

The global computer network generally known as the Internet has revolutionized the process of purchasing consumer products by allowing individuals to access virtually limitless amounts of information and a vast number of retailers in order to locate and purchase a desired product. The transaction of business over the Internet has become commonly known as electronic commerce, or "e-commerce." Through the use of personal computers running web browser programs which access the Internet via telephone modems or other network communication means, consumers are able to access literally thousands of different World Wide Web sites hosted by retailers selling every consumer product imaginable.

An integral part of e-commerce today involves operators of retail sales web sites (often referred to as merchants) compensating other web site hosts (commonly referred to as affiliates) to provide advertising banners, images, and links to the merchants' web sites in order to increase exposure of the merchant sites and the goods and services offered there. Affiliates are compensated for their support in a variety of ways, including what have come to be known as "pay per sale," "pay per click through," "pay per lead," and "pay per view" arrangements, depending on the nature of interaction with the user. Each of these arrangements bases the ultimate compensation on the number of users that view the merchant's ad or material on the affiliate web site, or else that "click through" a link contained in the merchant's ad or material, or in other similar ways.

From a merchant perspective, advertising on and having links from affiliate web sites is advantageous in that it increases exposure of the merchant's web site and thereby is likely to increase sales of goods and services being offered by the merchant. From an affiliate perspective, the ability to earn income by advertising, links, and sales support for various merchants on the affiliate web site can make operating the affiliate web site more lucrative.

The standard method of generating advertising banners, images, and links on affiliate web pages is to embed such content into the affiliate's web page. Web pages generally comprise source code in various forms, such as HTML code, JavaScript, Java, Flash, XML, DHTML, to name a few. The web page content generally contains all of the information necessary for the next rendering or display by a viewer's web browser, and may contain a static embedded link that identifies the particular merchant web page to be accessed.

Central linking web sites have been developed which allow merchants and affiliates to become registered members in order to centralize the accounting needed to compensate affiliates for click-throughs, banner advertisements, and sales resulting from the display of merchant advertising or links on the affiliate web sites. Information such as affiliate identifiers, merchant identifiers, and the actual merchant web site universal resource locators (URLs) themselves, are statically embedded into affiliate web pages. When a user visits an affiliate web site, the user's web browser receives the affiliate web page with the embedded static links. When the user activates a link (for example, by clicking on it), the user's web browser is directed first to the central linking web site, and then, based upon the merchant's URL embedded in the web page link, re-directed to the merchant web site. During this process, the central linking web site performs various accounting functions for both affiliates and merchants. For example, the web site system may credit affiliates for displaying merchant ads, and/or if the user clicks through to or purchases from the corresponding merchant web site. The merchant's account is simultaneously debited to reflect the payment made to the affiliate. All accounting information is stored on an accounting database that is part of the central linking system.

A central linking web site system as described above is advantageous in that it greatly simplifies and centralizes accounting for both merchants and affiliates. Compensation amounts to affiliates and debit amounts from merchants can be aggregated, with a single payment made to each affiliate and a single debit taken from the merchant on a regular basis. This relieves affiliates and merchants of the time consuming task of performing such accounting functions themselves.

In one aspect of today's e-commerce, merchants are desirous of having affiliates link to goods and services sold by merchant web sites, so as to increase the volume of such sales. In essence, such links are a form of advertising. Affiliates are paid for this advertising by a variety of ways, usually involving tracking of traffic from the affiliate's web site to the merchant's web site. Because affiliate revenue is often tied to such tracking, and merchant revenue benefits from such traffic, both the affiliate and the merchant have a vested interest in seeing that such links are placed on affiliate web pages where they will increase traffic to merchant web sites.

However, not all affiliate web sites maximize their ability to obtain revenue from links to merchant sites. Potential links are often ignored, for a variety of reasons. For example, the affiliate might not recognize a potential revenue link opportunity. In addition, even if a potential revenue link opportunity is recognized, the affiliate might not optimize its placement, or even optimize the number of links within a web page or web site. Furthermore, the affiliate might lack the time, know-how or willingness to create revenue links, even if the opportunity for such links is fully recognized.

Like advertising in media other than the Internet, some advertising on the Internet, and some merchant links on the Internet, are more effective than others. Effectiveness can be influenced by a host of factors, such as location, variety, placement, targeted audience and association with non-advertising content, to name just a few. Moreover, what works at one point of time may not work at another point in time, and vice versa.

To allow some level of versatility in web page advertisements, techniques have been developed by which a portion of the web page is reserved for advertising that is selected on the fly when a visiting user accesses the web page. Typically, remote ad serving systems operate by reserving an area of the web page for a graphic-based advertisement. At a remote, third party site, advertising servers dynamically determine what gets shown in the designated area of the web page, and serve selected ads into the designated area. In these systems, both the image of the ad as well as the destination of the ad are served from the same remote, third party advertising server. These types of systems have the advantage of allowing a remote server to control what gets shown in a web page, and of allowing web page owners to control what types of ads get shown in a web page without having to change any source code in the web page for different ads. However, these systems are not very flexible, in that they generally do not allow the web page owner to decide to have different types (e.g., image, text, streaming audio, etc.) of ads being served from a web page, without having to change the underlying source code in the web page.

Another conventional technique for allowing remote management of content in a web page is known as hosted ad serving. According to such a technique, the web page owner places software tags in a web page. Upon reading the web page file from a disk or memory, the web server reads the software tag and replaces it with the source code (usually HTML code) stored in an ad database. In this way, the web page owner can have different types of ads served from the same web page. The user's web browser receives a unified web page with the embedded content having replaced the tag. However, a drawback of hosted ad serving is that it requires an ad server installation on the web server serving the web page. In other words, the content owner is required to provide the ad server functionality on-site for replacing tags with source code stored in the ad database.

Some content providers serve content into predefined image areas of a web page by serving the image from the content provider's web server, and redirecting the user to content selected (e.g., clicked on) by the user. This technique is similar to the remote advertising server, but pertains to regular content and not just banner advertisements. A similar technique has been implemented in Java®, in the form of news scrollers served from a central location. However, these techniques for providing content suffer from the same drawbacks as those for serving ads remotely, in that they are not very flexible and do not allow the web page owner the choice of having different types of content being served from the web page, without having to change the underlying source code of the web page.

Accordingly, a technique that can permit remote management of content on a designated portion of a web page in a flexible and dynamic manner, would represent a significant advance in the state of the art of content provision via the Internet, or any other network of computers. Likewise, a technique that can increase the effectiveness of advertising on the Internet, and especially a method that permits such effectiveness to increase dynamically and flexibly, would also represent a significant advance in the state of the art of advertising via the Internet, or any other network of computers.

SUMMARY OF THE INVENTION

The present invention is generally directed, in one aspect, to methods and systems for inserting dynamic or variable type content from a web server into a designated portion of a web page over a distributed electronic network, such as the Internet.

In one embodiment, a remote content management system and method are provided whereby a web page owner defines one or more areas or zones of a web page as remotely managed, and then connects to a central server to manage those areas or zones. Preferably, a variety of different types of content may be placed into the pre-designated web page areas or zones, including, for example, image-based content, regular hyper-linked text, embedded Java® applets (or other platform-independent interpretable source code), flash files, audio files, and the like.

In one or more embodiments as disclosed herein, insertion of dynamic or variable type content from a web server into a designated portion of a web page is accomplished using a dynamic content code and a dynamic content host server code that has been embedded into the web page. The embedded dynamic content host server code causes a user's web browser to access the predetermined web server, and the dynamic content code indicates the content to be included in the web page. In certain embodiments, the dynamic content code may include such things as a program file name and an identification code.

In another separate aspect, a designated portion of the web page in which dynamic content is to be inserted may be defined by at least one content display attribute that is accessed based upon the dynamic content host server code embedded in the web page. The designated portion of the web page may encompass a portion of the web page, or the entire web page, and a web page may contain two or more designated portions in which dynamic content is inserted, each designated portion having a dynamic content code.

In another separate aspect, dynamic content is controlled by at least one content display attribute that is accessed based upon a dynamic content host server code. The dynamic content can be varied according to a content modification level or include a static content and a run-time modified content. The dynamic content code can include a program file name and an identification code, and the dynamic content can be varied according to a content modification level associated with the identification code, in which case the dynamic content can be static or include a run-time modified content.

In still another separate aspect, a web page with dynamic content can be generated in response to a request from a client computer to a host computer over a computer network to access the web page. After the request is sent, a dynamic content server computer is accessed based upon a dynamic content code embedded within the web page. A program file is run based upon the dynamic content code to generate the dynamic content, which is then inserted into the web page and displayed on the client computer. The program file can be selected based upon a program file name contained within the dynamic content code. The program file can use an identification code included in the dynamic content code to generate the dynamic content. This can be done by use of a plurality of content display attributes associated with the dynamic content, which may contain a content attribute and a display attribute. The program file may vary the dynamic content according to at least one content modification level. The dynamic content can include a static content and a run-time modified content.

In a further separate aspect, the dynamic content code is generated in association with a remote page created by a user on a dynamic content host computer. The remote web page has a plurality of content display attributes that define its look and behavior. The plurality of content display attributes can be automatically defined after the user selects an automatic definition option or the user can permit the dynamic host computer to modify at least one of the plurality of content display attributes based upon a pre-selected criterion. The user can define a content level within the remote web page that limits how a specified portion of the remote page can be modified, and this content level can be defined to permit automatic modification based upon a pre-selected criterion. A dynamic content server computer, which can be the same as the dynamic content host computer, is updated with the remote web page.

In yet additional, separate aspect of the present inventions, the dynamic content code can be embedded in additional web pages and can include a potential revenue link.

Further embodiments, variations, enhancements and modifications are also disclosed herein.

BRIEF DESCRIPTION OF THE DRAWINGS

FIG. 4 is a diagram of a lookup table as may be used to dynamically retrieve merchant link and image data in accordance with one or more embodiments as disclosed herein.

FIG. 6 is an illustration of one embodiment of a system for providing merchant link and image data across a distributed electronic network using a dynamic lookup table.

FIGS. 7A–7D are diagrams comparing process flows for providing impressions and processing click-through links as currently known in the art (FIGS. 7A and 7B) and as carried out in accordance with preferred embodiments described herein (FIGS. 7C and 7D).

FIGS. 8A, 8B and 8C are diagrams illustrating one possible operation of the system illustrated in FIG. 6 in connection with provision of dynamic merchant link information to a user.

FIGS. 9A, 9B and 9C are diagrams illustrating another possible operation of the system illustrated in FIG. 6 in connection with provision of dynamic merchant link information to a user.

FIGS. 12A through 12D are diagrams illustrating an example of content management of a portion of a web page performed by a remote server.

DETAILED DESCRIPTION OF PREFERRED EMBODIMENTS

Figure 11:
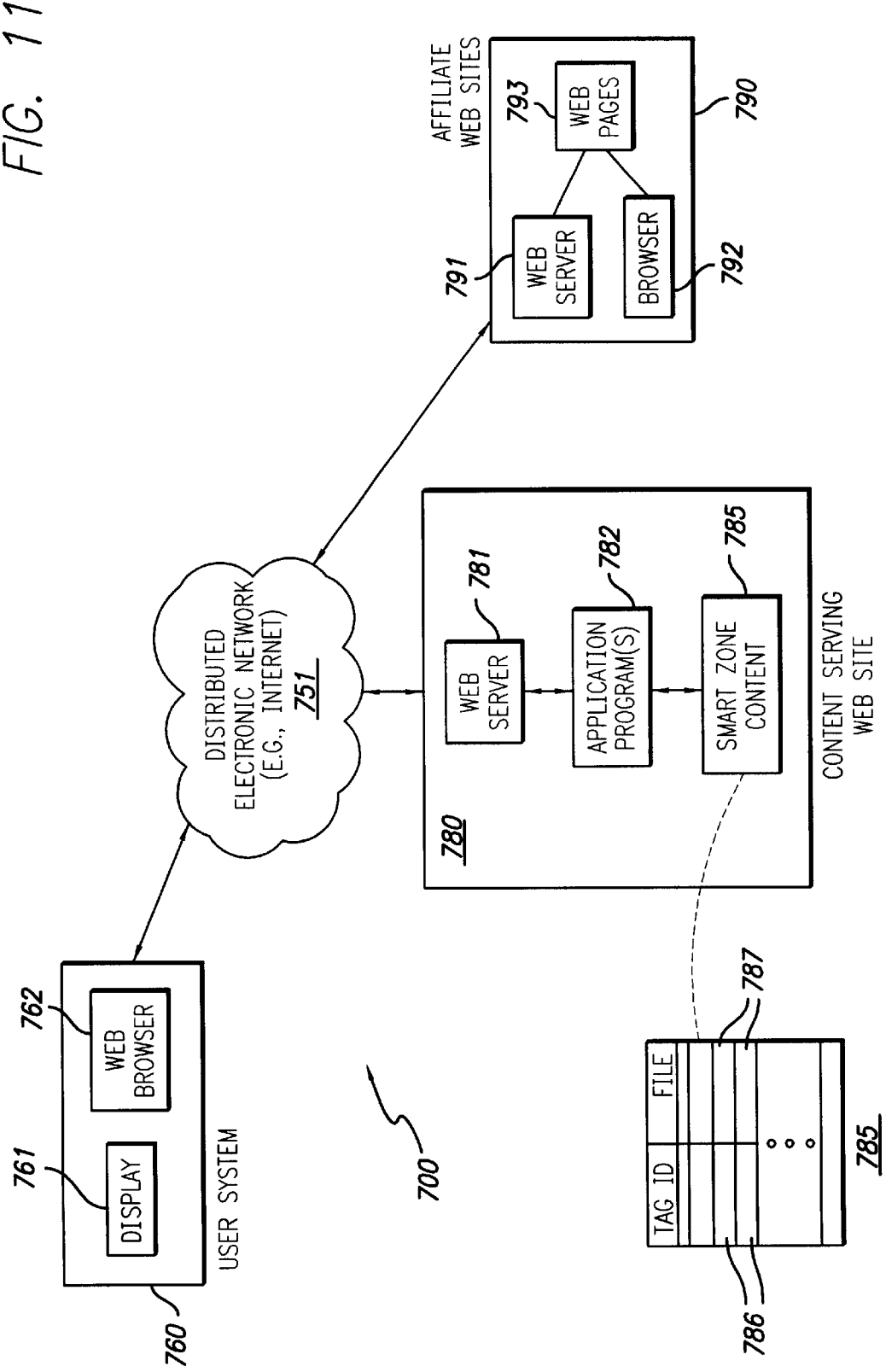
FIG. 11 is a conceptual diagram illustrating one embodiment of a system for inserting dynamic content from a remote web server into a designated portion of a web page over a distributed electronic network.

FIG. 11 is a conceptual diagram illustrating one embodiment of a remote content management system 700 for inserting dynamic content from a web server into a designated portion of a web page over a distributed electronic network. As illustrated in FIG. 11, the remote content management system 700 includes a content serving web site 780 connected to a distributed electronic network 751, such as the Internet. For the purposes of further explanation herein, the distributed electronic network 751 is assumed to be the Internet, and thus reference is made to system features such as web servers, browsers, and the like. However, the principles described with reference to FIG. 11 (and FIGS. 12A through 12D below) are not limited to the Internet, and may be practiced in the context of other types of distributed electronic networks as well.

Also connected to the distributed electronic network 751 is at least one affiliate web site 790 and at least one user system 760. In a generic sense, an "affiliate" may be viewed as an entity that has the right to control the content of a web site. The term "content" can include, among other things, graphics, images, text, video data, audio data, applications, code and/or other forms of information. A user system 760 may generally be embodied as a computer terminal (which may be connected in a local area network or else may be standalone), but may also comprise other devices such as wireless Internet-compatible computer devices. The user system 760 preferably includes a web browser 762, which is an application program allowing users to navigate across the distributed electronic network 751. THe user system 760 may also include a display 761 (such as a computer screen or monitor) for displaying data, including information gathered by the web browser 762. The user system 760 may connect to the distributed electronic network 751 by way of an Internet service provider (ISP) (not shown in FIG. 11) or other Internet gateway.

The affiliate web site 790 generally includes a web server 791 which provides one or more web pages 793 to visiting users, such as from user system 760, connected across the distributed electronic network 751. A web page is generally the content that is served through a computer system over a network using standard protocols, such as the standard protocols of the World Wide Web. An example of such a protocol is hyper-text transfer protocol ("HTTP"). Often, web pages 790 are comprised of data described in a standard web language, such as, for example, hyper-text markup language ("HTML"). Typically, a web page corresponds to a particular, unique identification code that describes its network location; in the context of the Internet, this unique identification code is a universal resource locator ("URL"), such as "www.cj.com/a," and includes the content associated with the entity owning the web site. The affiliate web site 790 may be reached by a user entering the affiliate web site's URL into the browser 762 at the user system 760, which causes the browser 762 to contact the affiliate web site 790 over the distributed electronic network 751. A number of intermediate steps may be involved in this connection process, such as utilizing the domain name system to translate the alphanumeric URL into a sequence of numbers uniquely identifying the physical location of the target web site, and transmitting a request over the distributed electronic network 751 communicate with the target web site.

The affiliate web site 790 may also include a browser 792, allowing users at the affiliate web site 790 to navigate the distributed electronic network 751 and contact other web sites. For example, a user at the affiliate web site 790 may want to contact the content serving web site 780 to modify content that will be inserted into web pages 793 when rendered at a user browser 762, as explained in more detail hereinafter.

The content serving web site 780, in one sense, provides dynamic content insertable into web pages 793 rendered from the affiliate web site 790. The dynamic content is inserted into pre-designated zones or areas of the web pages 793 which may be referred to for convenience as "smart zones" due to their flexible nature. The dynamic content for insertion into the smart zones is stored in a smart zone content database 785. The content serving web site 780 also includes a web server 781 which, among other things, responds to requests from the user system web browser 762 for dynamic content. One or more application programs 792 at the content serving web site 780 provide intermediary functions as needed between the web server 781 and the smart zone content database 785.

The smart zone content database 785 preferably comprises a set of indexed entries. The table entries preferably comprise modifiable content, made accessible to outside entities (e.g., the affiliates who own the content) through an application program 782 such as a smart zone content management interface run at the content serving web site 780.

One possible embodiment of the smart zone content database 785 is depicted in FIG. 11. As illustrated, the smart zone content database 785 may include as entries a plurality of tag identifiers (IDs) 786 which are received from the user system browser 762 during the rendering of a web page 793, and a plurality of files 787 associated with the tag IDs 786. The files 787 preferably comprise interpretable source code, such as, e.g., JavaScript or a similar type of source code. The source code of files 787 may instruct the user web browser to embed certain text or files, which may be located at the same web site as the files 787 (i.e., the content serving web site 780) or a remote web site. When the source code of the files 787 is interpreted by the user web browser, the result is that any type of desired content may be inserted into the smart zone, including, for example, image-based content, regular hyper-linked text, embedded Java® applets (or other platform-independent interpretable source code), flash files, audio files, and the like.

FIGS. 12A through 12D are diagrams illustrating an example of content management of a portion of a web page performed by a remote server. In general, a web page owner (in this case, the operator of affiliate web site 790) defines one or more areas or zones (i.e., smart zones) of a web page 793 as remotely managed, and then connects to the content serving web site 780 to manage the smart zones by identifying dynamic content to be inserted in them. By way of the affiliate browser 792, a user at the affiliate web site 790 may access the smart zone content database 785 and alter the file 787 associated with the tag IDs 786 owned by the affiliate. Preferably, the affiliate is only authorized to alter the entries in the smart zone content database 785 which are indicated by an owner field in the database as being owned by the particular affiliate. In a preferred embodiment, dynamic content is inserted into a web page 793 by use of a dynamic content code or tag embedded within the web page 793. Therefore, when creating web pages 793, the affiliate embeds dynamic content codes into the web pages 793 when intending to define a designated area (i.e., smart zone) for remote content management.

It is preferred that the dynamic content code contain a dynamic content host server code, a program file name and an identification code. The dynamic content host server code is used to access a predetermined web server (which may be a plurality of web servers). The program file name is used to run a program file. The program file uses the identification code to generate the dynamic content.

An example of one possible type of dynamic content code or tag as may be embedded into a web page 793 may be of a form as follows:

<SCRIPT LANGUAGE="javascript" src="<URL>"></script>

Such a code or tag may be used to pull a program code (such as JavaScript or other type of platform-independent interpretable code) from the content serving web site 780. When retrieving the web page 793 from the affiliate web server 790, the user system browser 762 will recognize the above dynamic content code or tag and request the script from the web site defined by the URL—in this example, the content serving web site 780. The script retrieved from the content serving web site 780 then instructs the user system browser 762 to perform an action, such as rendering certain HTML code. The script returned from the central serving web site 780 might, for example, look like:

<script language="javascript">
document.write("<a href='http://track4.com/12-3242'><img src='http://track4.com/1c-32123'></a>")
</script>

The above "document.write" statement specifies the HTML code to be written to the user's display 761 by the user system browser 762. Since the script is being served from remote content serving web site 780, the data set and programs running at the content serving web site 780 control what gets shown at the user system 760 by the user system browser 762. Therefore, by interacting with the stored dynamic content at the content serving web site 780, the affiliate can decide, and to choose to alter at any time, what to display in the designated zone or area (i.e., smart zone) of the web page 793, without changing any of the source code of the web page 793.

Figure 2:
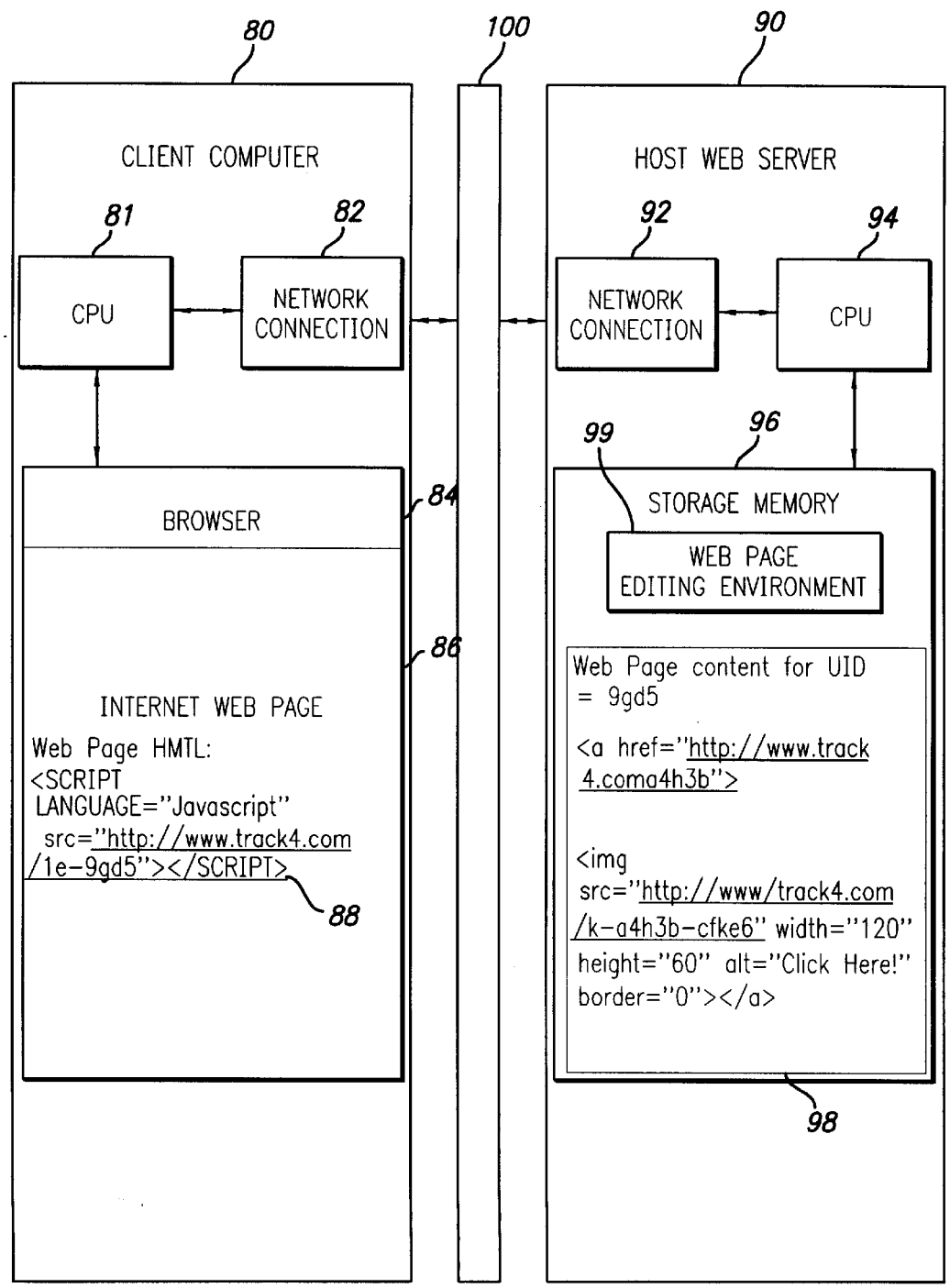
FIG. 2 is a diagram illustrating web page content editing in the context of a client-server network such as shown in FIG. 1.

Another example of the use of dynamic content may be described with reference to FIG. 2. In FIG. 2, a client computer 80 (with a CPU 81 and standard network connection 82) communicates with a host server computer 90 (also possessing a CPU 94 and standard network connection 92). In the present example, the client computer 80 may correspond to a computer at the affiliate web site 790, while the host server computer 90 may correspond to the content serving web site 780. The client computer 80 and host server 90 are connected via an electronic network 100, as previously described in connection with, e.g., FIG. 11. Dynamic output 98 used by the client computer 80 to display links or web page content is obtained by a call string 88 embedded in the code (such as HTML code) of a web page 86 displayed on the client computer's web browser 84. The call string 88 passed to the host server 90 can be in the form of, for example, a Java applet, JavaScript, Flash, or any one of various other program/script languages supported by the host server 90. Based on parameters passed in the call string 88, the host server 90 will return output 98 stored in memory 96 to the calling web page 86.

In a preferred embodiment, the output 98 needed to display the dynamic web page content is retrieved by an initiating call string 88 passed to the host server when the web page 86 is loaded on the user's browser 84. The call string 88 passed to the host server 90 embedded in the web page's HTML code preferably contains the following components: a URL denoting a file address, a program file designation, and a user ID. An example of a JavaScript call to the remote content server would be:

```
<SCRIPT LANGUAGE="javascript" src="http://
   www.track4.com/1e-9gd5"> </SCRIPT>
```

In this example, http://www.track4.com/" is the URL indicating the file address, "1e" is the program file name, and "9gd5" is the UID 9gd5 (in base 36). When this portion of the HTML code of the web page 86 is executed, the source URL directs a call to the location of the host server 90. The server 90 parses the UID 95 and passes it to the program file at run time. During execution, the designated program file uses the parsed UID 95 to retrieve the appropriate output 98 for the calling web page 86. The retrieved output 98 is then passed back to the calling web page 86 for execution by the web browser 84, resulting in display of the desired content. A simple example of the retrieved output 98 which may be passed back to the user's web browser 84 may be as follows:

```
<a href=http://www.track4.com/a-a4h3b-cfke6>
<img src=http://www.track4.com/k-a4h3b-cfk6" width=
   "120" height="60"
alt="Click Here!" border="0"></a>
```

In this example, the retrieved output 98 will cause an image to be loaded with tracking codes when it is executed at the user's web browser 84.

The web page owner may optionally include one or more parameters in the URL call string 88 embedded in the remote web page 86. Preferably, such parameters include at least the following: 1) the height of display area, 2) the width of the display area, and 3) a subset (or smart zone) name. These parameters are used to send extended information to the host server 90 for processing. An example of a JavaScript call to the host server 90 using the three parameters is the following:

```
<SCRIPT LANGUAGE="javascript" src="http://
   www.track4.com/1e-9gd5-120-60-JCLSite"></SCRIPT>
```

In the above expression, the value 120 represents the height parameter, the value 60 represents the width parameter, and JCLSite is the subset name (i.e., smart zone name) parameter. If height and width parameters are included in the call string 88, the host server 90 uses the values as the dynamic content display size. The subset name corresponds to a desired UID, and will be used to retrieve content display attributes 140. If the subset name does not already exist on the host server 90, it will be created with completely automated content.

Another alternative implementation uses the DHTML layer feature, with the layer being served from the content serving web site 780.

Returning now to FIG. 11, the dynamic content code or tag can be generated as part of a process by which a user at the affiliate web site 790 generates, or defines, what the dynamic content will be. This process is illustrated graphically in FIG. 12D, whereby a user at the affiliate web site 790, via the affiliate browser 792, accesses the dynamic content database 785. Thus, when creating a web page 793, a user accesses a dynamic content host computer (i.e., the content serving web site 780) to define the dynamic content and, in particular, the program file name, associated with the dynamic content code. The user specifies as part of the embedded dynamic content code the dimensions and location of the pre-designated zone or area (i.e., smart zone) that will have content inserted into it when the web page 793 is rendered at a user system 760.

The web page 793 generally has a plurality of display attributes that define its look and behavior. The user can define a content level within the web page that limits how a specified portion of the web page 793 can be modified. This content level can be defined to permit automatic modification based upon a pre-selected criterion. For example, if a portion of the web page 793 contains a potential revenue link, the user could specify how the potential revenue link is selected and dynamically updated. The user might also select an automatic definition option that automatically defines the display attributes of the web page 793. The user might also permit the dynamic content host computer (i.e., the content serving web site 780) to modify at least one of the plurality of content display attributes based upon a pre-selected criterion. After the web page 793 is created, it is stored at the affiliate web site 790, while the dynamic content remains stored on the content serving web site 780.

After a user has created a web page 793 and generated a dynamic content code, the user can embed the same dynamic content code in additional, but different, web pages 793.

Figure 12A:
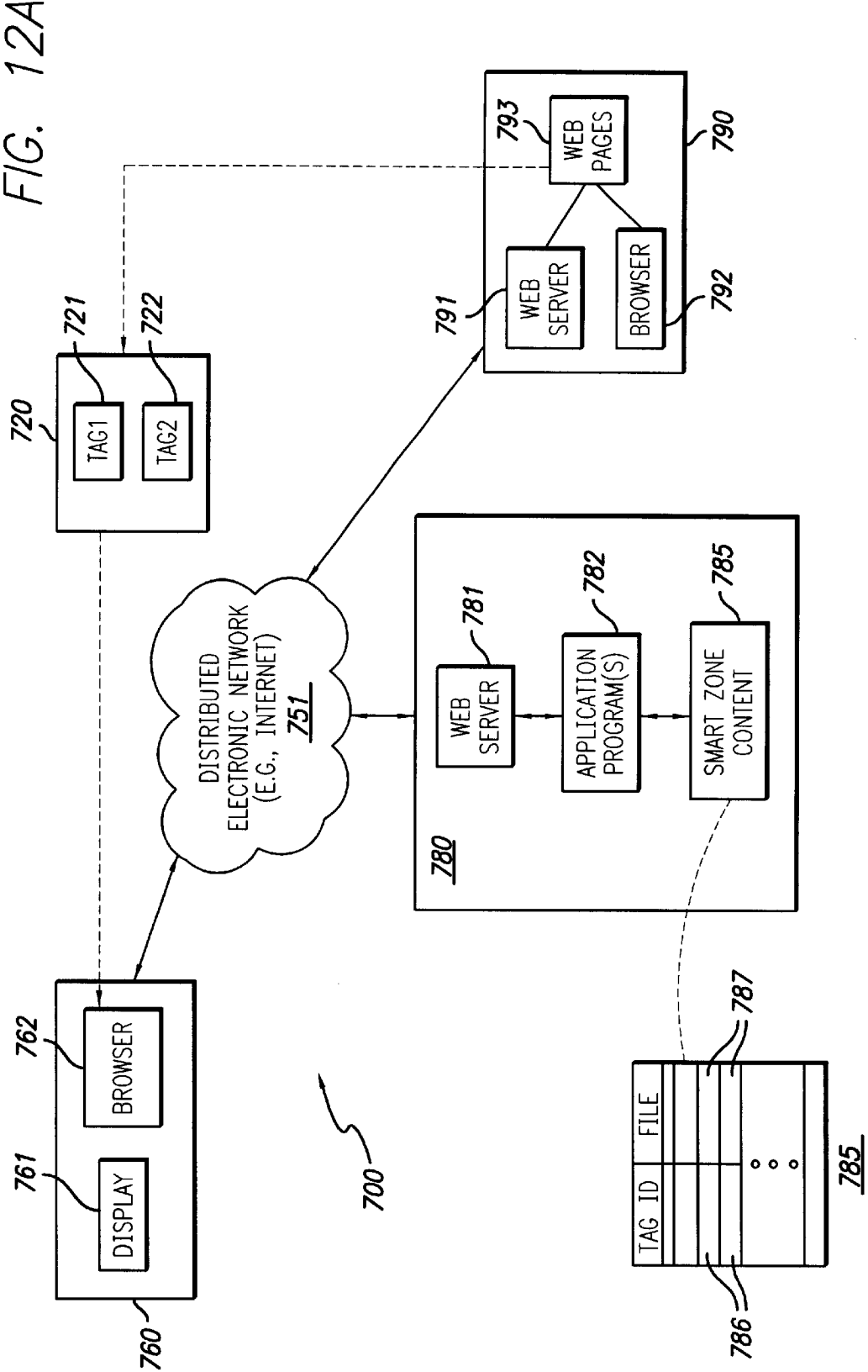
Figure 12B:
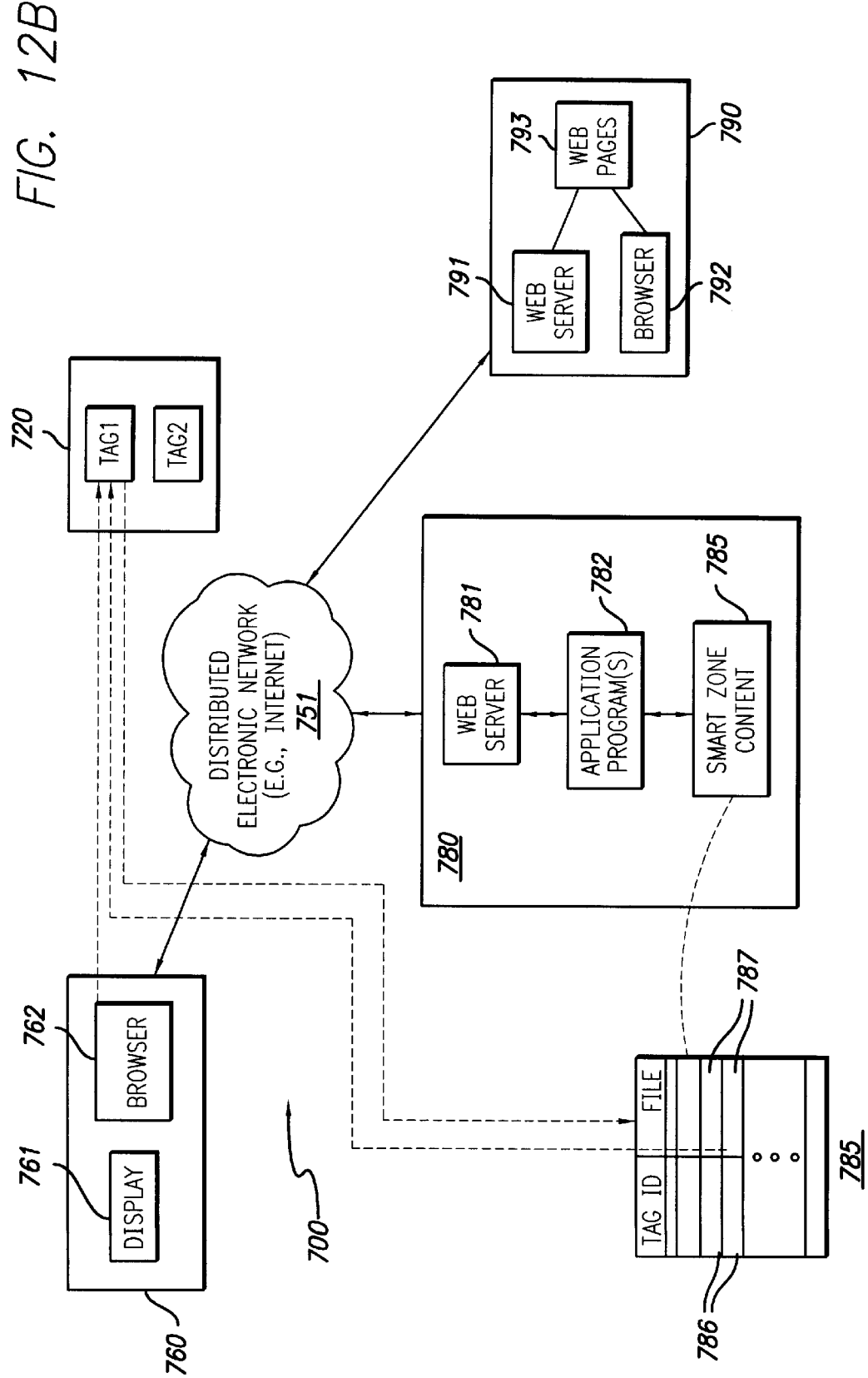

Once a dynamic content code is embedded in a web page 793, the web page 793 with dynamic content inserted into it can be rendered at a remote user system 760 in response to a request from the user system browser 762 to the affiliate web site 790 to access the web page 793. This process is illustrated graphically in FIGS. 12A, 12B and 12C. As shown first in FIG. 12A, in response to a request from the user system browser 762, a web page 720 from among stored web pages 793 is served from the affiliate web server 791 to the user system browser 762. The web page 720 contains one or more dynamic content codes or tags—in this example, two such codes or tags 721, 722. The user system browser 762 eventually reads the first dynamic content code 721 and, in response thereto, issues a request containing the tag ID to the content serving web site 780 to retrieve the dynamic content associated with the tag ID, as illustrated in FIG. 12B. In response to the request from the user system browser 762, the content serving web site 780 looks up the file 787 associated with the dynamic content from the dynamic content database 785, using the tag ID 786 as a key, and sends the file 787 to the user system 760. At the user system 760, the user system browser 762 reads the file (which may comprise, for example, JavaScript or a Java applet), and performs the actions specified thereby in relation to the pre-designated zone of the web page 793.

Similarly, the user system browser 762 eventually reads the second dynamic content code 721 and, in response thereto, issues a request containing the second tag ID to the content serving web site 780 to retrieve the dynamic content associated with the second tag ID, as illustrated in FIG. 12C. In response to the request from the user system browser 762, the content serving web site 780 looks up the file 787 associated with the dynamic content from the dynamic content database 785, using the second tag ID 786 as a key, and sends the second file 787 to the user system 760. At the user system 760, the user system browser 762 reads the second file (which, again, may comprise, for example, JavaScript or a Java applet), and performs the actions specified thereby in relation to the second pre-designated zone of the web page 793.

Accordingly, a system is provided whereby an affiliate may easily and flexibly modify the type of content on an affiliate web page 793, without modifying the source code of the web page 793. Further, the affiliate does not need any special software at the affiliate web site 790 for inserting content in a web page 793 on the fly. Rather, the insertion process is carried out by communications between the user system browser 762 and the content serving web site 780. This type of system 700 is particularly advantageous where there are many affiliate web sites 790, each having web pages 793 with insertable dynamic content, since a single, central content serving web site 780 can be responsible for all of the overhead involved in maintaining and inserting dynamic content as required by user systems 760 visiting the affiliate web sites 790.

The dynamic content that is inserted into a web page can take on many different forms, and several different types of dynamic content can be inserted into a single web page 720. As previously noted, the different types of content might include, for example, image-based content, regular hyperlinked text, embedded Java® applets (or other platform-independent interpretable source code), flash files, audio files, and the like. The dynamic content might also comprise a potential revenue link, such as a banner ad, or some other form of advertising. The number and location of multiple dynamic content files inserted into a web page might be determined from executing a program for establishing potential revenue links in the web page. Or, the dynamic content might represent a substantial portion of the web page, or even the entire web page. The dynamic content might also alter the display characteristics of static content embedded within the web page. For example, the dynamic content might rearrange or reformat such static content.

Because of the flexibility provided by the dynamic content generated in accordance with the techniques described herein, a web page can be dynamically rearranged or regenerated so as to take advantage of dynamically changing conditions. This provides affiliates with a very powerful tool for maximizing the effectiveness of advertising contained on their web pages, and thereby increase the potential revenue generated from an affiliate web site 790.

To provide a simple illustration of the flexibility of the present invention, assume that an affiliate is operating an affiliate web site 790 that is rich with sports content. The affiliate might select a portion of several web pages 793 within the site in which dynamic content is to be inserted. The dynamic content in one web page 793 might automatically update scores for a certain professional sports, and the manner in which those scores are displayed could vary depending upon how old the scores are, or how important the game was. A potential revenue link could also be included within the same dynamic content, and its selection might be keyed off the winner of a sporting event. The dynamic content in another web page 793 might automatically provide a commentary based upon content within that web page 793, and the dynamic content might also include a potential revenue link related to the source of the commentary, such as subscription information. The dynamic content in another web page 793 might contain potential revenue links to sporting equipment or accessories that are in season, or are enjoying current popularity. In addition, the nature and character of the potential revenue links contained in these varying web pages 793 might be dynamically changed. For example, the revenue links might be displayed as banner ads one time, and as buttons or hyperlinks another time, or at different times of the day. All of which is to say that the dynamic nature of the dynamic content files can lead to an almost endless possibility for choices of dynamic content, if that is the desired result.

To better describe the techniques relating to various preferred embodiments, further details appear below in connection with a more detailed description of how the methods and systems of the preferred embodiments can be utilized and implemented in an overall system.

In the following description, a general description of a system in which a remote content management system can be utilized will first be described. The purpose of this description is not to limit the present invention; instead, it is meant to provide the reader with background information. Next, a description of how one skilled in the art can use a merchant oriented lookup table and http request compression to improve the implementation of such methods. Next, there is a description of how one skilled in the art can select potential revenue links.

FIG. 6 is an illustration of one embodiment of a system 350 for providing merchant link and image data across a distributed electronic network using a dynamic lookup table 383. It should be understood that while the system 350 is described in the context of providing link and image data for accessing merchant web sites via affiliate web sites, the principles involved with using of a lookup table to provide dynamic link information are not limited to this contextual setting and, in fact, can be used in a wide variety of other settings as well.

As illustrated in FIG. 6, a central linking web site 380 connects to a distributed electronic network 351, such as the Internet. For the purposes of further explanation herein, the distributed electronic network 351 is assumed to be the Internet, and thus reference is made to system features such as web servers, browsers, and the like. However, the principles described with reference to FIG. 6 are not limited to the Internet, and may be practiced in the context of other types of distributed electronic networks as well.

Also connected to the distributed electronic network 351 are a number of merchant web sites 370 and affiliate web sites 390. In a generic sense, an "affiliate" may be viewed as an entity that has the right to control the content of a web site. The term "content" can include, among other things, graphics, images, text, video data, audio data, applications, code and/or other forms of information. A "merchant" may be viewed as any entity that is willing to compensate an affiliate for use of at least a portion of an affiliate web site 390 or information generated at least in part based upon the affiliate. Typically, merchant web sites 370 supply or offer goods or services to others. Affiliates may or may not sell or offer goods or services. While affiliate web sites 390 and merchant web sites 370 are shown as physically different sites in FIG. 6, this manner of illustration is primarily for conceptual purposes, as it is possible for a web site to be both a merchant and an affiliate.

Also connected to the distributed electronic network 351 are a number of user systems 360. User systems 360 will generally be embodied as computer terminals (which may be connected in a local area network or else may be standalone), but may also comprise other devices such as wireless Internet-compatible computer devices. Each user system 360 preferably includes a web browser 362, which is an application program allowing users to navigate across the distributed electronic network 351. A user system 360 typically also includes a display 361 (such as a computer screen or monitor) for displaying data, including information gathered by the web browser 362. User systems 360 may connect to the distributed electronic network 351 by way of an Internet service provider (ISP) (not shown in FIG. 6) or other Internet gateway.

Affiliate web sites 390 each generally include a web server 391 which provides one or more web pages 393 to visiting users from user systems 360 connected across the distributed electronic network 351. A web page is generally the content that is served through a computer system over a network using standard protocols, such as the standard protocols of the World Wide Web. An example of such a protocol is hyper-text transfer protocol ("HTTP"). Often, web pages 390 are comprised of data described in a standard web language, such as, for example, hyper-text markup language ("HTML"). Typically, a web page corresponds to a particular, unique identification code that describes its network location; in the context of the Internet, this unique identification code is a universal resource locator ("URL"), such as "www.cj.com/a," and includes the content associated with the entity owning the web site. An affiliate web site 390 may be reached by a user entering the affiliate web site's URL into the browser 362 at the user system 360, which causes the browser 362 to contact the corresponding affiliate web site 390 over the distributed electronic network 351. A number of intermediate steps may be involved in this connection process, such as utilizing the domain name system to translate the alphanumeric URL into a sequence of numbers uniquely identifying the physical location of the target web site, and transmitting a request over the distributed electronic network 351 communicate with the target web site.

An affiliate web site 390 may also include a browser 392, allowing users at the affiliate web site 390 to navigate the distributed electronic network 351 and contact other web sites. For example, a user at the affiliate web site 390 may want to contact the central linking web site, 380 to obtain information (e.g., links), as explained hereinafter, to populate some or all of the web pages 393 at the affiliate web site 390.

Merchant web sites 370 also each generally include a web server 372 which provides one or more web pages 371 to visiting users from user systems 360 connected across the distributed electronic network 351. A merchant web site 370 may also include a browser 373, allowing users at the merchant web site 370 to navigate the distributed electronic network 351 and contact other web sites. For example, a user at the merchant web site 370 may want to contact the central linking web site 380 to alter information (e.g., links), as explained hereinafter, which affects the ultimate content of web pages 393 provided to visiting users at the affiliate web site 390.

The central linking web site 380, in one sense, provides linking information between affiliate web sites 390 and merchant web sites 370. The linking information is stored in a "dynamic" lookup table 383. The central linking web site 380 also includes a web server 381 which, among other things, responds to requests from affiliate web sites 390 for linking information. Application programs 382 resident at the central linking web site 380 are executed to carry out various functions of the central linking web site 380. The application programs 382 may access the dynamic lookup table 383 or an optional accounting database 384, the general purpose of which is to track usage of the dynamic links in any of a variety of manners, as will be described in more detail hereinafter.

The dynamic lookup table 383 preferably comprises a set of indexed entries. The table entries preferably comprise modifiable content and/or code links, made accessible to outside entities (e.g., merchants) through an application program such as a merchant interface run at the central linking web site 380. One possible embodiment of the dynamic lookup table 383 is depicted in FIG. 4 and described hereinafter.

In certain embodiments, the dynamic lookup table 383 comprises a list of destination links (e.g., universal resource locators), which may be deep links, corresponding to files or web pages at the various merchant web sites 370, along with index information by which the destination links may be accessed. These files may comprise image data, text data, audio data, or other such data for presentation to a viewer, and therefore may generically be referred to as presentation files. The term presentation file is intended to encompass all types of data, particularly data that can be rendered or otherwise processed so as to provide a sensory experience by sight, sound or otherwise to the viewer. Web pages 393 at the affiliate web sites 390 may contain index references (for example, advertisement identifiers ("ad id's")) to the destination links in the dynamic lookup table 383.

The information in the dynamic lookup table 383 may be used in a variety of different manners. In a preferred embodiment, the central linking web site 380 is involved in tracking the activity of the user systems 360, and the information in the dynamic lookup table 383 is used in a manner so as to allow the maximum possible. tracking of user system activity (within overall efficiency constraints) and thereby maximize the value of services provided by the central linking web site 380. In other embodiments, however, less or no user tracking is acceptable.

In one embodiment, when a web page 393 is provided to a user system 360 from an affiliate web site 390, the web page 393 contains hidden, embedded links containing index information for the dynamic lookup table 383 at the central linking web site 380, along with instructions to the user browser 362 to retrieve the content from the central linking web site 380. Preferably without user intervention, the user system browser 362 transmits the index information for each embedded link to the central linking web site 380 which, in response thereto, looks up the destination link corresponding to the index information of the embedded link. The central linking web site 380 then retrieves the information (e.g., an image file, such as a banner advertisement) from the destination link location, which will typically be at a merchant web site 370. The central linking web site 380 transmits the retrieved information to the user system browser 362, which displays it at the user system 360. Preferably, along with the retrieved information, the central linking web site 380 also transmits an embedded click-through link associated with the displayed information, containing a link back to the central linking web site 380 along with a redirect destination link to the merchant web site 370.

At the user system 360, a user may activate (e.g., click on) the click-through link, which will cause the user system browser 362 to send to the central linking web site 380 a redirect request to the merchant web site 370: The central linking Web site 380 tracks the user's request, then processes the request and redirects the user system 360 to the merchant web site 370. The merchant web site 370 then serves a web page 371 corresponding to the destination link for display or other processing at the user system 360.

Alternatively, rather than providing a click-through link to the user system 360, the central linking web site 380 may simply provide the merchant destination link directly to the user system 360. However, in such a case, the central linking web site 380 will be unable to track the user's selection of the link and its subsequent communication with the merchant web site 370.

To facilitate the above process, the dynamic lookup table 383 preferably comprises at least a merchant destination link and a content file identifier which identifies the location of a presentation file (e.g., banner advertisement) or, potentially, a set of presentation files. The presentation files may be stored at the central linking web site 380. Alternatively, they may be stored at a merchant web site 370. In addition to the presentation file destination link, the dynamic lookup table 383 may also store a product description destination link, which provides a link to a file containing descriptive information about an offered product; an image or other media destination link, which provides a link to a file containing a graphical image or other media content (e.g., audio information) relating to an offered product; and a purchase destination link, which provides a link to a site for processing a product purchase. All of the links for a particular entry in the dynamic lookup table 383 may be associated with the same web site; however, they may also be associated with different web sites, if desired.

In another embodiment, when a web page 393 is initially provided to a user system 360 from an affiliate web site 390, the affiliate web site 390 contacts the central linking web site 380 to obtain, based upon the index information in the web page 393, the corresponding destination links stored in the dynamic lookup table 383. The central linking web site 380 returns the destination links 383 to the affiliate web site 390, which either embeds them in the web page 393 or else retrieves the content corresponding to the designation links 383 and embeds the content into the web page 393. The affiliate web site 390 then delivers the web page 393 to the user system 360 over the distributed electronic network 351. At the user system 360, the user browser 362 may automatically retrieve the content associated With the embedded destination links from the merchant (or other) web sites 370 (if the affiate web site 390 has not already done so). Alternatively, a user may activate (e.g., click on) the destination link, which may cause the user system browser 362 to communicate with the appropriate merchant web site 370 and, more specifically, to retrieve the web page 371 or file corresponding to the destination link for display or other processing at the user system 360.

An advantage of the system 350 illustrated in FIG. 6 is that merchants can maintain complete control over the content of their advertisements, and, by making changes to the information in the dynamic lookup table 383, may make changes at will to the content associated with their advertisements. In addition, any changes will be immediately reflected in any and all affiliate web pages 370 referencing the advertisement, without any effort on the part of the affiliate(s).

If the affiliate web site 390 is being compensated for each display at a user system 360 of a link to a merchant web site 370 (commonly known as "pay per view"), the accounting database 384 may be updated to reflect a credit to the affiliate's account and a debit to the merchant's account when requested destination link information is retrieved from the dynamic lookup table 383. This transaction may occur, depending upon the embodiment, when the user system browser 362 requests the destination link information, or else when the affiliate web site 390 requests the information.

When a user clicks on or otherwise activates or selects the destination link, the user system browser 362 may notify the central linking web site 380. If the destination link is a click-through link, then notification of the central linking web site 380 is inherent; otherwise, the user system browser 362 may need to transmit a notification message to the central linking web site 380 prior to accessing the site indicated by the destination link. The central linking web site 380 may then, if desired, update the accounting information in the accounting database 384 to reflect the fact that a particular destination link has been activated. If the affiliate web site 390 is being compensated for each actual resulting link between a user system 360 and the merchant web site 370 (commonly known as "pay per click"), the accounting database 384 may be updated to reflect a credit to the affiliate's account and a debit to the merchant's account.

Figure 9C:
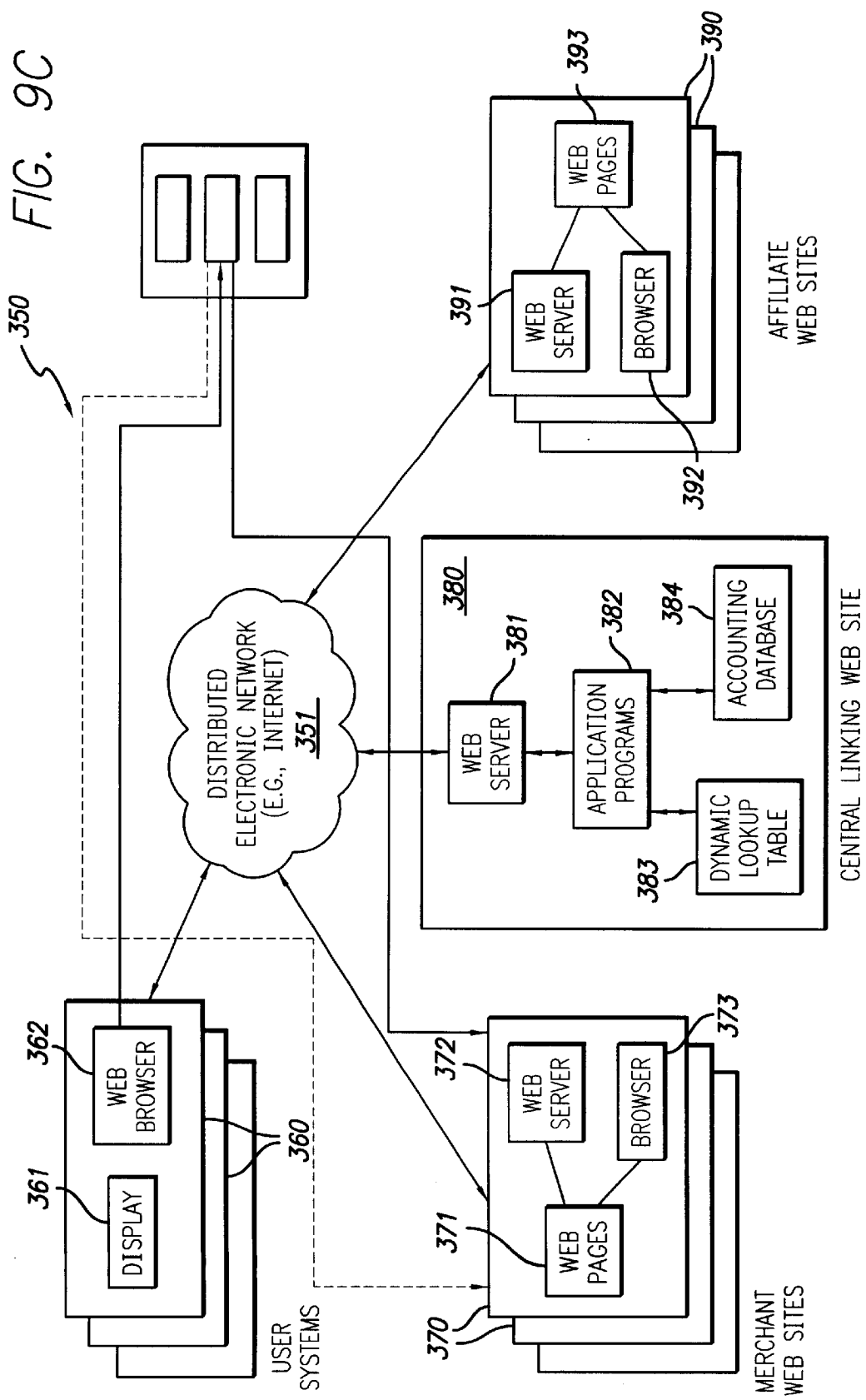

The aforementioned processes are illustrated graphically in two different embodiments in FIGS. 8A, 8B and 8C and in FIGS. 9A, 9B and 9C. FIGS. 9A, 9B and 9C collectively illustrate the situation where the lookup request for information from the dynamic lookup table 383 is made from the user system browser 362, while FIGS. 8A, 8B and 8C collectively illustrate the situation where the lookup request for information from the dynamic lookup table 383 is made from the affiliate web site 390.

In more detail, starting first with the embodiment illustrated in FIGS. 9A, 9B and 9C, a request is initially made to access an affiliate web site 390 from the user system browser 362 by entry of an appropriate address—e.g., "www.affiliate.com", as illustrated in FIG. 9A. In response to the request from the user system browser 362, the web server 391 at the affiliate web site 390 serves the requested web page 378 to the user system 360. The web page 378 may contain embedded links to the central linking web site 380 or, more specifically, index information referencing the dynamic lookup table 383 at the central linking web site 380 along with instructions to the user browser 362 to retrieve the content from the central linking web site 380. Preferably without user intervention, the user system browser 362 transmits the index information for each embedded link to the central linking web site 380 which, in response thereto, looks up the destination link corresponding to the index information of each embedded link.

The central linking web site 380 then retrieves the information (e.g., an image file, such as a banner advertisement) from the destination link location, which will typically be a reference to a location at the central linking web site 380. However, the content information may also be stored at a merchant web site 370, and may be accessed by the central linking web site 380 making a back-end request to the merchant web site 370 for the particular data (which alternative is illustrated in FIG. 9A by the arrow connecting to the merchant web site 370, and in FIG. 9B by the return of content files 377).

As illustrated further in FIG. 9B, the central linking web site 380 transmits the retrieved information to the user system browser 362, which displays the content 379' at the user system 360. Alternatively, instructions may be transmitted from the central linking web site 380 to the user system browser 362 redirecting the browser to a location at which the presentation file is stored, which may be at any accessible web site connected to the distributed electronic network 351. This lookup process may be repeated individually for each separate embedded link 379 in the web page 378.

At the user system 360, as illustrated now in FIG. 9C, a user may activate (e.g., click on) a click-through link associated with any of the presented content, which will cause the user system browser 362 to send to the central linking web site 380 a redirect request to the merchant web site 370. The central linking web site 380 tracks the user's request (e.g., updates the accounting database 384), then processes the request and redirects the user system 360 to the merchant web site 370. The merchant web site 370 then serves a web page 371 corresponding to the selected link for display or other processing at the user system 360. The merchant web page 371 itself may contain any type of content, including additional links.

Alternatively, rather than providing a click-through link to the user system 360, the web page may simply provide a direct link to the merchant site 370. However, in such a case, the central linking web site 380 will be unable to track the user's selection of the link and its subsequent communication with the merchant web site 370, unless the user system browser 362 is also instructed to separately contact the central linking web site 380 to record the transaction.

An advantage of the system and process described with respect to FIGS. 9A, 9B and 9C is that no direct communication is generally needed between the central linking web site 380, the merchant web site 370 or the affiliate web site 390. Rather, the central linking web site 380, the merchant web site 370 and the affiliate web site 390 only need to communicate with the user system browser 362 to achieve most or all of the functionality described above. In some embodiments, "cookies" (i.e., small data records stored on a user system browser 362 when the user visits a web site) may also be used to facilitate the aforementioned interactions.

The embodiment illustrated in FIGS. 8A, 8B and 8C will now be described in more detail. As shown first in FIG. 8A, in response to a request from the user system browser 362, the affiliate web site 390 retrieves an appropriate web page 393, which may contain various URLs or static links to the central linking web site 380 along with embedded index information referencing the dynamic lookup table 383 at the central linking web site 380. Via its browser (or equivalent) 392, the affiliate web site 390 sends a request to the central linking web site 380 to obtain information or related content from the dynamic lookup table 383. The central linking web site 380 retrieves the destination links corresponding to the indexing information in the web page 393 and, in one embodiment, retrieves the content files (e.g., banner advertisements) from a local storage area referenced by the destination links. Alternatively, however, the central linking web site 380 retrieves content files 377 associated with the destination links by making one or more back-end requests to the merchant site 370.

The content files are then relayed to the affiliate web site 390 and embedded in a modified web page 375 containing associated click-through links, as illustrated in FIG. 8B. The modified web page 375 is then transported to the user system 360, whereupon it is displayed by the user system browser 362. In an alternative embodiment, however, the affiliate web site 390 substitutes the indexing information with the destination links retrieved from the dynamic lookup table 383, rather then content files, resulting in a modified web page 375, which is then transported to the user system 360, where it is displayed by the user system browser 362.

As illustrated now in FIG. 9C, if the user decides to select or activate one of the links (e.g., by clicking it) in the web page 375, the user system browser 362 responds by communicating with the target web site (in this example, a merchant web site 390) represented by the selected link. If the link is part of a click-through link, then the connection to the merchant web site 390 may be made via the central linking web site 380, whereupon an appropriate accounting transaction (e.g., credit to the affiliate, debit to the merchant) in the accounting database 384 may take place the web server 372 at the merchant web site 390 then serves the requested web page 371 to the user system 360, whereupon it is displayed for the user by the user system browser 362. The merchant web page 371 itself may contain any type of content, including additional links.

Figure 10:
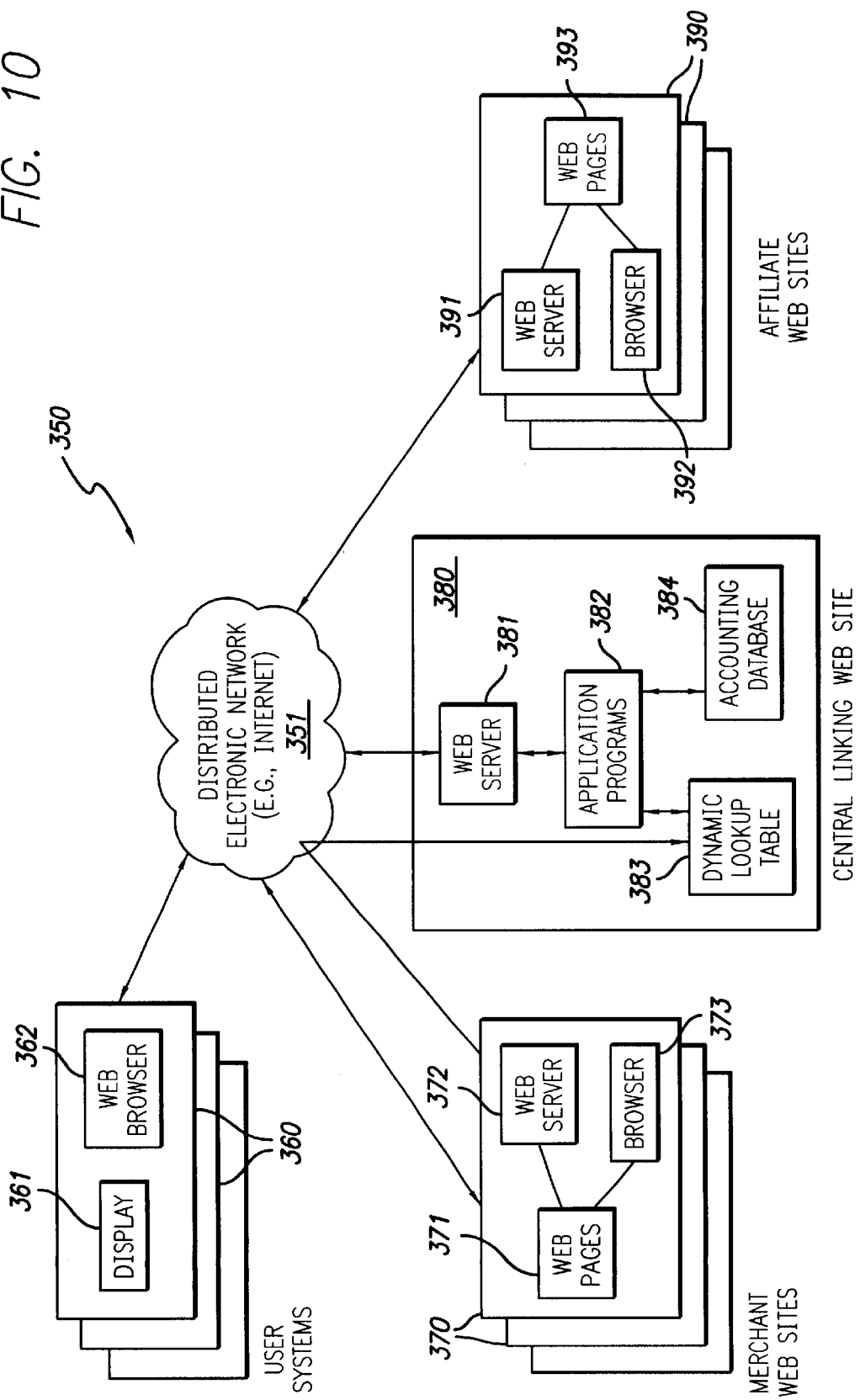
FIG. 10 is a diagram illustrating modification of the dynamic lookup table by merchant web site operators.

FIG. 10 is a diagram illustrating the update of information in the dynamic lookup table 383 by a merchant at the merchant web site 373. The merchant may utilize the web browser 372 at the merchant web site 370 to contact the central linking web site 380, which may return a web page including a screen interface for updating the dynamic lookup table 383. The screen interface may be configured to allow the merchant to update or modify only that information specific to the merchant web site 390. The merchant may thereby update, modify or replace a web page 371, including changing its top-level domain name, by altering the destination link stored in the dynamic lookup table 383, and by making a singular change automatically cause every affiliate web page 393 that had previously referred to old destination link to immediately switch to the new destination link, without having to modify any code in the affiliate web pages 393. The merchant may also be provided with the ability to download presentation files (e.g., image files, banners, etc.).

In a preferred embodiment, the central linking web site 380 provides a back-end batch process for adding or modifying entries in the dynamic lookup table 383 en masse. The batch process may require merchant data to be presented in a particular, pre-specified format, such as in a file containing specifically ordered index information and associated destination link information for each desired entry in the dynamic lookup table 383. To facilitate this process, each merchant may be provided with a unique merchant ID which is required to be the first portion of the index or key to each destination link, so that the uniqueness of each table entry is ensured and so that no conflicts will arise between different merchants. The batch process parses the merchant file and automatically inserts entries into the dynamic lookup table 383. The merchant may optionally provide other parameters which are allowable in the dynamic lookup table 383 as well, such as those parameters described with respect to FIG. 4.

In one aspect, an application of a dynamic lookup table is described herein with reference to a system employing a number of affiliate web sites and merchant web sites, such as illustrated in FIG. 6, wherein the affiliates provide to visiting users web pages dynamically created from modifiable content and destination links obtained in real time via the central linking web site 380. A user's selection of a destination link may cause a transfer to the destination web site, preferably via the central linking web site 380 (if the link is click-through in nature) which acts as an intermediary. As part of the transfer to the destination web site, tracking may be carried out at the central linking web site 380. The presentation or selection of a merchant's destination link may result in a monetary credit to the affiliate web site, which may be tracked and maintained in the aggregate by the central linking web site 380.

Figure 1:
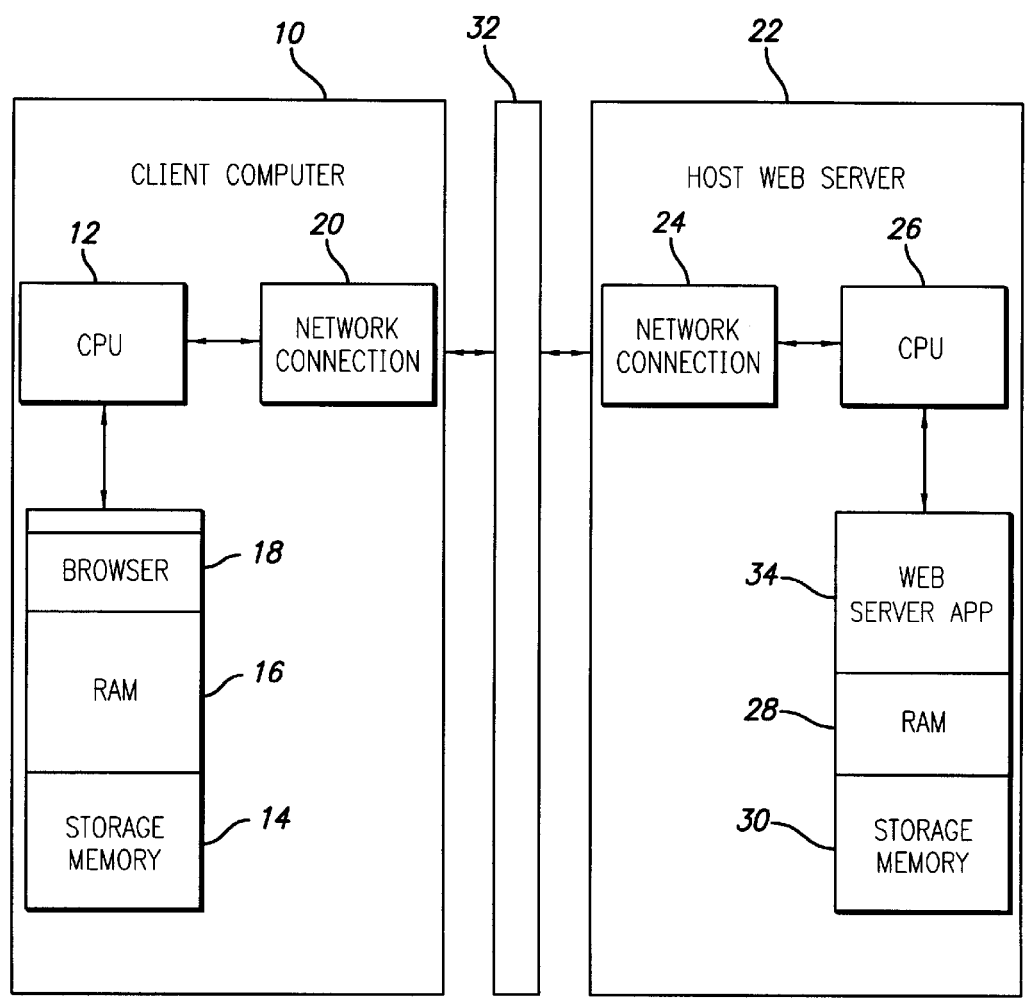
FIG. 1 is a block diagram illustrating a client-server network relationship as may be utilized in connection with certain embodiments as disclosed herein.

Various general principles concerning connections between computers across a distributed electronic network 351 may be further explained with reference to FIG. 1, which illustrates a "typical" client-server network connection that may be operated in accordance with various embodiments as described herein. The client-server network shown in FIG. 1 includes one or more client computers 10 and at least one host computer 22. A "client computer" in this context may be viewed as a device that sends a request for content to a host computer. A "host computer" in this context may be viewed as a device that receives a request for content from a client computer and acts upon that request. As illustrated in FIG. 1, the client computer 10 and the host computer 22 are connected over an electronic network 32, which may be any network connection, but is preferably the global computer network commonly known as the Internet or another type of distributed electronic network. Depending upon its use, a given computer may be a client computer, a host computer, or both.

The client computer 10 can be any standard personal computer (PC) which includes a central processing unit (CPU) 12 connected to both storage memory 14 and random access memory (RAM) 16. RAM 16 is used to load and run application programs as well as for storing data during run time. The storage memory 14 stores a variety of computer programs including a web browser 18. A web browser 18, as previously indicated, is generally a program used to communicate with remote server computers 22 and to visually (or audibly, if appropriate) present web page content received from the servers 22. The client computer 10 may establish network communications through any standard network communication device of software 20.

The host computer 22 may be of any conventional server design, and may include, for example, a central processing unit (CPU) 26, a network connection device 24, and both storage memory 30 and random access memory (RAM) 28. The storage memory 30 stores a web server application 34 and one or more application computer programs.

In one aspect, according to various embodiments as described herein, systems and methods are provided for dynamically determining a destination link from a code link in connection with a lookup table that uses at least one parameter in the code link to access the destination link from the lookup table. The code link may, in certain embodiments, be embedded within a web page that is to be transported to a visiting user. In a preferred embodiment, "basic" information is contained in the code link, while "dynamic" information is looked up from a lookup table located on a host computer (located at, e.g., a remote web site), at run-time. Basic information is preferably the minimal amount of information necessary to perform the look up at the web server along with any additional information that is specific to the web site the link is located on. However, in alternative embodiments, information other than basic information (as described immediately above) may be contained in the code link.

A preferred embodiment is described in connection with a dynamic lookup table (such as, for example, dynamic lookup table 383 illustrated in FIG. 6 and dynamic lookup table 240 illustrated in FIG. 4). A lookup table is a common software data structure that is well known to those skilled in the art of computer programming. In its simplest form, a lookup table can be thought of as a table of data. The table has one or more entries and one or more data fields per entry, including a key data field. Table data can be accessed by specifying a value for the key field, which is the index for the lookup table. By providing a key value, a table entry can be retrieved and the data fields of the entry can be accessed. While various embodiments are generally described with reference to a lookup table, the scope of this disclosure is not meant to be so limited, and the term "lookup table" is meant to include any data structure, programming device, option, or program that performs the same or equivalent function.

In a preferred embodiment, a dynamic lookup table is accessed by a request that is sent from a client computer (e.g., a user system 360 as shown in FIG. 6) to a host computer (e.g., central linking web site 380) to access the destination link based upon the code link embedded within a web page. The result is dynamic retrieval of merchant Uniform Resource Locator (URL) link data 248 from a lookup table 240 that resides in the RAM memory of the central linking web site system 380. FIG. 4 shows a layout of a preferred lookup table 240 used to dynamically retrieve merchant link 248 and image data 242. Preferably, the lookup table 240 is keyed by an advertisement identification number (AID) 250 associated with a particular merchant, Table entries store destination URL data 248, banner or image data 242, and at least two binary indicator fields 244, 246 used to indicate various conditions for system processing. The use of the lookup table 240 and retrieved data is described in more detail below.

The conventional practice for processing URL links to Internet web sites is for a client system (e.g., a user system 360) to pass all information necessary for the next operation to a host web server (e.g., central linking web server 381) as a static uniform resource indicator (URI) and name-value pairs in the hypertext transfer protocol (HTTP) web site link. Such a process generally does not allow dynamic changes to those parameters. In order to change URI or name-value pair information implemented as static values, the web site's hypertext markup language (HTML) must be changed. An example of a typical merchant click-through link using static URI and name-value pairs is the following:

<a href="http://www.cj.com/track/track.dll?AID=
 20097&PID=166422&URL=
 http%3A%2F%2Fwww%2Edestinationurl%2Ecom">

A click-through link redirects a user's web browser 362 to load and display a new destination web site page. The example click-through link above redirects the web browser 362 to the www.destinationurl.com destination URL after running the www.cj.com/track/track.dll program, which may be one of the application programs 382. This program uses AID, PID, and URI name-value pairs passed as parameters. The PID parameter in this embodiment is a unique ID used to identify the specific affiliate web site 390 containing the merchant presentation link call which accesses the merchant lookup table 240.

An example of a typical merchant presentation link using static name-value pairs is the following:

<img src="http://www.cj.com/banners/tracker.exe?PID=
 166422&AID=20097&banner=20097%2Egif" width=
 "120" height="60" alt="Click Here!" border="0"></a>

A presentation link passes an image file back to the user's web browser 362 to be displayed on the current web site page. The example presentation link above displays an image called 20097.gif on the browser 362 after running the www.cj.com/banners/tracker.exe program, which may be one of the application programs 382. This program uses the PID, AID 250, and banner name-value pairs as passed parameters. In the two examples above, the values of the destination URL www.destinationurl.com and the display image 20097.gif are 'hard coded" into the HTML of the executing web site page. These values are static and can only be changed by actually changing the HTML code. If these values are included in the code of a large number of web pages, the process of modifying HTML code for a multitude of web pages in order to use a different set of values can be extremely time consuming. Storing image 242 and destination URL 248 values for various merchant links on a lookup table 240 for dynamic retrieval allows easy modification of web site links and banner displays by simply changing the destination or banner data for a particular merchant advertisement. This changes the dynamically retrieved destination URL 248 and image 242 information for all web pages accessing a particular merchant AID 250 in the merchant lookup table 240.

In a preferred embodiment, URL and banner image information for various merchants are referenced in a lookup table 240 stored in a random-access memory (RAM) of a central linking web site system 380. Storing the merchant data in a lookup table 240 loaded in RAM allows for much faster run-time retrieval than storing the data on a database in the central linking web site system's 380 mass storage. The URL and name-value pair information for each merchant is stored in the lookup table 240 keyed by an advertisement identification number (AID) 250.

An example of a merchant presentation link which dynamically accesses the merchant lookup table 240 is the following:

<img src=http://www.cj.com/banners/tracker.exe?PID= 166422&AID=20097 width="120" height="60" alt= "Click Here!" border="0"></a>

The above link will display a dynamically determined image 242 on the user's web browser 362 after running the www.cj.com/banners/tracker.exe program with PID and AID 250 name-value pairs as parameters. The merchant AID 250 is used as a key into the lookup table 240 to dynamically retrieve the banner data 242 designated for that merchant, and the retrieved banner data 242 is then displayed by the user's web browser 362.

An example of a merchant click-through link which dynamically accesses the merchant lookup table 240 is the following:

<a href="http://www.cj.com/track/track.dll?AID= 20097&PID=166422">

Figure 5:
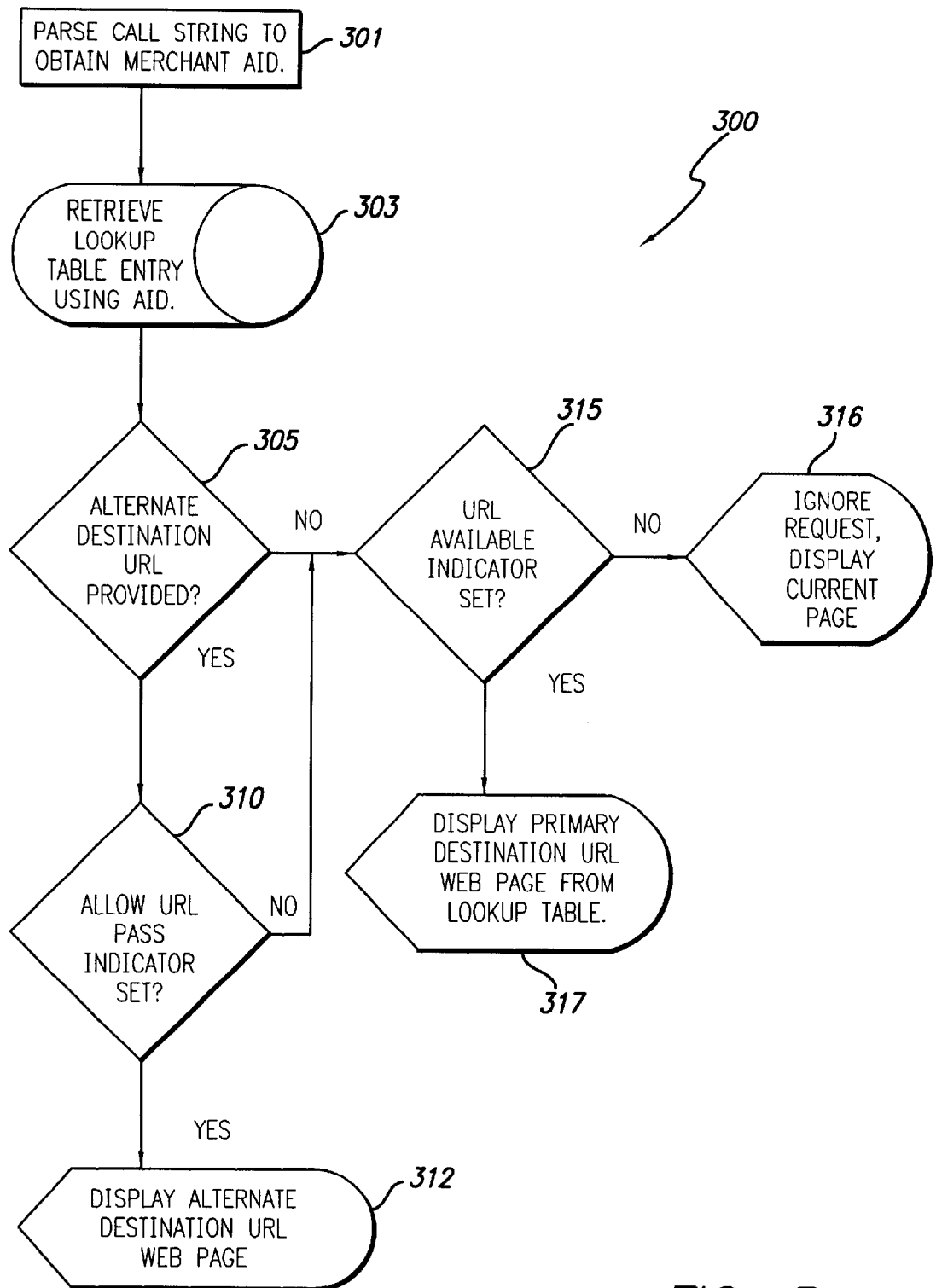
FIG. 5 is a process flow diagram illustrating one embodiment in which merchant link and image data is dynamically retrieved from a merchant oriented lookup table at a central host computer in connection with a click-through link request.

This link will redirect the user's web browser 362 to a dynamically determined destination URL 248 after running the www.cj.com/track/track.dll program with the AID 250 and PID name-value pairs as parameters. A flow chart indicating the processing logic for a merchant click-through link is shown in FIG. 5. The AID 250 is used as a key into the lookup table 240 to retrieve the primary destination URL 248 designated for that merchant. That destination URL 248 is then used by the user's web browser 362 to load the destination web site page.

FIG. 4 depicts an embodiment of the lookup table 240 in which two binary indicator fields, Allow URL Pass 244 and URL Available 246, are used to designate predetermined processing options for the central linking web server's 381 redirection of the user's web browser 362. The Allow URL Pass indicator 244 set to "yes" allows the user's browser 362 to be directed to an alternate URL value rather than the primary URL 248 stored on the lookup table 240. In a preferred embodiment, the alternate URL value is statically coded in the merchant click through link which accesses the merchant look up table 240, but the alternate URL value can also, in another embodiment, be stored as a field of the lookup table 240. If the Allow URL Pass indicator 244 is set to "no", the user's browser 362 will be redirected to the primary destination URL 248 stored in the lookup table 240 whether or not the merchant click through link passed a static alternate URL value. The URL Available indicator 246 will be evaluated if the user's browser 362 is redirected to the primary destination URL 248 stored in the lookup table 240. If the URL Available indicator 246 is set to "yes", the redirection of the user's browser 362 to the primary destination URL 248 is performed. If the URL Available indicator 246 is set to "no", the redirect is not performed.

Use of the above described binary indicator fields is advantageous to merchants and affiliates in several respects. If the destination URL 248 stored in the lookup table 240 would direct a user's browser 362 to a web page for a particular product that is currently unavailable or subject to delivery delays beyond a preselected limit, the merchant has the capability of preventing a user's web browser 362 from being redirected to that web page on either a temporary or permanent basis. By simply setting the URL Available indicator 246 to "no" for a particular AID 250, the merchant is able to instantly prevent any user's from being redirected to the destination URL 248 when that particular advertisement is activated (e.g., clicked on) from an affiliate's web page 393. This functionality is operable without changes to the web page HTML of any affiliate web pages displaying advertisement.

If the primary destination URL 248 should for any reason become unavailable, the URL Pass indicator can be set to "yes" to allow redirection to an alternate destination URL, such as a merchant's home page. Such an indicator can be of tremendous significance to the efficient functioning of an overall system. By way of illustration, an overall system might link hundreds, or thousands, or more, affiliate web pages to a single primary destination URL 248 that is very desirous and popular at a given point in time. However, if the dynamic lookup table application manager (which may be, e.g., an application program 382 at the central linking web site 380, in the particular example illustrated in FIG. 6) learns that the particular destination URL 248 has become unavailable in response to a request originated from just one of the affiliate web pages 393, the Allow URL Pass indicator 244 can be automatically triggered for all of the affiliate web pages using that primary destination so that a default destination URL is used. Similarly, if the particular URL once again becomes available, the Allow URL Pass indicator 244 can be untriggered for all of the affiliate web pages using that URL as a primary destination. Such instant and widespread modification of so many different affiliate web pages is a significant advantage of certain embodiments described herein.

The lookup table might also contain pre-selected indicators that allow specific affiliates or merchants to avoid doing business with each other altogether, or only when specified conditions are met. For example, an affiliate might activate a flag to preclude any links to a merchant if the affiliate believes that the particular merchant has provided poor customer service or unacceptable delays. Alternatively, the affiliate might only wish to disable links to a specified product, or to a specified type of product. For example, the affiliate might wish to disable any links to products that are deemed unsuited to a general age category, or that would otherwise be deemed inappropriate for inclusion by the affiliate in the affiliate's web page. Similar and other considerations, from the viewpoint of a merchant, could be incorporated into flags to be triggered by the merchant.

FIGS. 7A–7D are diagrams comparing process flows for tracking impressions and processing click-throughs as currently known in the art (FIGS. 7A and 7B) and, in contrast, as carried out in accordance with various preferred embodiments described herein (FIGS. 7C and 7D). As shown in FIG. 7A, in a conventional practice, a impression may occur when a presentation file is provided via a link to the viewer's browser. As a first part of this process, the viewer's browser is provided with a web page with an embedded static link. The viewer selects the embedded static link (e.g., by clicking on it or otherwise), which results in a connection to a tracking web server identified by the static link. In response, the tracking web server runs a program to track the selection of the link by the viewer, and then returns an image or presentation file (e.g., a banner) to the viewer's web browser. In FIG. 7B, the process is similar, except that rather than returning an image or presentation file to the viewer's web browser, the tracking web server redirects the viewer's web browser to a destination corresponding to a click-through destination link embedded as part of the static link.

FIG. 7C illustrates the delivery of an image or presentation utilizing a dynamic lookup table in accordance with one or more embodiments as disclosed herein. As illustrated in FIG. 7C, the first few steps are similar to those in FIG. 7A; that is the viewer's browser is first provided with a web page having an embedded static link, and the user then selects the embedded static link (e.g., by clicking on it or otherwise), which results in a connection to a tracking web server identified by the static link. In response, the tracking web server runs a program to track the selection of the link by the user, and then looks up the location (either locally or on a remote web site) of an image or other presentation file from a dynamic lookup table using indexing information within the embedded static link, and returns the image or presentation to the viewer's web browser.

FIG. 7D illustrates a situation involving a click-through to another destination site. The first several steps in FIG. 7D are similar to those set forth in FIG. 7B, However, several additional intervening steps have been added. In step 4 of FIG. 7D, a check of an availability flag is made to determine if the particular destination link is available. In step 5, a check is made to determine whether an alternative destination link (e.g., URL) should be invoked. In step 6, the primary or alternative destination link (e.g., URL) is looked up, depending upon the result of step 5. In step 7, the viewer's web browser is redirected to the primary or alternative destination link, as the case may be.

In implementing preferred methods and systems in accordance with the various embodiments described herein, it is particularly useful to provide for insertion of dynamic content into designated locations on affiliate web pages 393. FIG. 2 generally illustrates an example of the insertion of dynamic content into a designated web page location (which can be referred to as a "smart zone"). As illustrated in the example of FIG. 2, a client computer 80 (with a CPU 81 and standard network connection 82) communicates with a host server computer 90 (also possessing a CPU 94 and standard network connection 92). The client computer 80 and host server 90 are connected via an electronic network 100, as previously described in connection with FIG. 1. Dynamic output 98 used by the client computer 80 to display links or web page content is obtained by a call string 88 embedded in the code (such as HTML code) of a web page 86 displayed on the client computer's web browser 84. The call string 88 passed to the host server 90 can be in the form of, for example, a Java applet, JavaScript, Flash, or any one of various other program/script languages supported by the host server 90. Based on parameters passed in the call string 88, the host server 90 will return output 98 stored in memory 96 to the calling web page 86. The returned output 98 can be in the form of HTML code, JavaScript, Java, Flash, XML, DHTML or any other content that is acceptable to the client's receiving web page 86. This output 98 is executed as part of the remote web page 86 on a client computer's 80 web browser 84, resulting in the display of the desired dynamic web page content.

In a preferred embodiment, the web site owner performs a user setup for each different dynamic content display desired, and a calling URL 88 with appropriate parameters is inserted in the web page HTML 86 for each page where the content is to be displayed. In another preferred embodiment, dynamic web page content may be displayed in multiple locations on any given web page, or an entire web page may be defined for dynamic retrieval and display.

Figure 3:
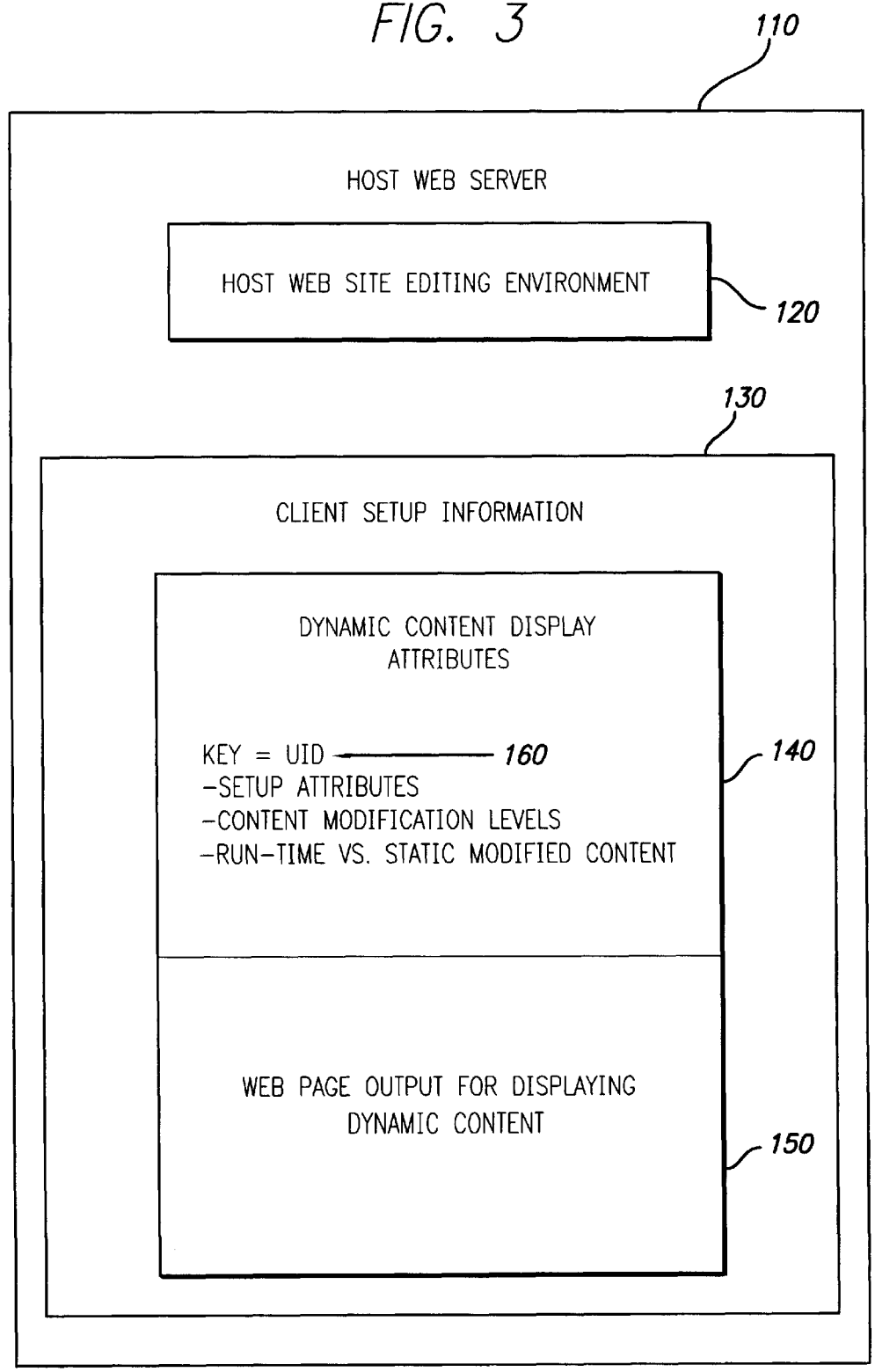
FIG. 3 is a conceptual diagram of a host web site server with application software which may be used for creating and editing client setup information.

FIG. 3 illustrates an example wherein a host web site server 110 and application software 120 are used for creating and editing client setup information 130. In one embodiment, an editing environment 120 supported by the host web site server 110 is used by a client to create and store both output for displaying dynamic web page content 150 as well as dynamic content display attributes 140. By accessing a host server web site 110, a user creates and sets up various attributes 140 to define the look and behavior of the dynamically displayed web content for a particular user web page 86. For example, the setup attributes 140 might indicate how many banners should randomly rotate when the dynamic content 150 is displayed on a client computer 80 web browser 84. By defining the setup attributes 140, a user can also define content modification levels. The content modification levels indicate to the host server 110 which dynamic content displayed on the web page 86 can be automatically modified by the host server 110. These levels can vary from limiting changes to only those made manually by the user, to allowing the host server 110 to freely modify the dynamic web page content.

Another group of setup attributes affects the level of static versus run-time modified content displayed on the user's web page 86. A user can select to allow only a static level of content on the remote web page 86 so it can be verified as correct before the web page 86 is put into general use. Alternatively, the user can select to have varying amounts of dynamic content up to and including allowing full run-time remote web page evaluation, building, and distribution. All of the user designated setup attributes 140 will be stored on the host server 110 keyed by a unique user identification number (UID) 160. The UID 160 will be passed to the host server 110 during remote web page initialization in order to access and process the user designated setup attributes 140.

In a particular variation of the method and system illustrated in connection with FIG. 2, a web page content editing environment 99 on the host web server 90 allows a user to build remote web page 86 custom content by entering or modifying web page HTML code 98 to be stored on the host server 90. Editing can also be accomplished by dragging and dropping desired text, images, and controls from within the editing environment 99 on the host server 90. Alternatively, standard web editing tools which upload to the host server 90 may be used for dynamic web page content editing. Further details regarding these techniques may be found in copending U.S. patent application Ser. No. 09/617,062 (titled "Method and System for Facilitating Creation and Operation of A Virtual Store") filed concurrently herewith, previously incorporated by reference as if set forth fully herein.

In another embodiment, a dynamic content display area on a remote web page 86 can automatically be created by passing a subset name and dynamic display identification number to the host server with a calling URL 88. This call to the host server 90 creates a dynamic content display area on the remote web page 86 with completely automatic content, or alternatively, using the dynamic content display attributes 140 defined during the setup process. Further details regarding these techniques may be found in copending U.S. patent application Ser. No. 09/617,061 (titled "Method and System for Remote Content Management of A Designated Portion of A Web Page") filed concurrently herewith, previously incorporated by reference as if set forth fully herein.

In another embodiment, a dynamic content display area on a remote web page 86 can automatically be created by passing a subset name and dynamic display identification number to the host server with a calling URL 88. This call to the host server 90 creates a dynamic content display area on the remote web page 86 with completely automatic content, or alternatively, using the dynamic content display attributes 140 defined during the setup process. Further details regarding these techniques may be found in copending U.S. Patent Application Ser. No. 09/617,061 filed concurrently herewith, previously incorporated by reference as if set forth fully herein.

In operation, the output 98 needed to display the dynamic web page content may be retrieved by an initiating call string 88 passed to the host server when the user's remote web page 86 is loaded on a browser 84. The call string 88 passed to the host server 90 embedded in the code (such as HTML code) of the remote web page 86 preferably contains at least the following components: a URL denoting a file address, a program file designation, and a user ID ("UID"). An example of a JavaScript call to the remote server would be:

<SCRIPT LANGUAGE="javascript" src="http://www.track4.com/1e-9gd5"> </SCRIPT>

In the above example, "http://www.track4.com/" is a URL indicating the file address, "1e" is the program file name, and "9gd5" is the user ID "9gd5" (in base 36). When this portion of the web page's code is executed, the source URL directs the call to the location of the host server 90. The server 90 parses the UID 9gd5 and pass it to the program file at run time. During execution, the designated program file uses the parsed UID 9gd5 to retrieve the appropriate output 98 for the calling web page 86. The retrieved output 98 is then passed back to the calling web page 86 for execution by the web browser 84, resulting in display of the desired content.

In a preferred embodiment, the user may optionally include any one of three parameters in the URL call string 88 embedded in the remote web page 86: 1) height of display area, 2) width of the display area, and 3) subset name. These parameters may be used to send extended information to the host server 90 for processing. An example of a JavaScript call to the host server 90 using the three parameters is the following:

<SCRIPT LANGUAGE="javascript" src="http://www.track4.com/1e-9gd5-120-60-JCLSite"> </SCRIPT>

In the above example, the value "120" represents a height parameter, the value "60" represents a width parameter, and "JCLSite" represents a subset name parameter. If height and width parameters are included in the call string 88, the host server 90 uses the values as the dynamic content display size. The subset name corresponds to a desired UID, and will be used to retrieve content display attributes 140. If the subset name does not already exist on the host server 90, it may be created with completely automated content.

In implementing preferred methods of the present invention, it may be useful to provide for compression of HTTP requests in order to reduce the length of such request strings contained in web page code. Use of a numeric base larger than standard base ten to represent numeric values included in an HTTP request reduces the number of digits necessary to represent the values, thereby reducing the overall length of the HTTP request string. This is beneficial to a web page owner using the HTTP request in his or her web page code due to the sensitivity to character string length inherent in web page HTML coding.

In a preferred technique for HTTP request compression, a base thirty-six system is used to encode numeric values used in HTTP request strings whenever these strings are inserted into web page content to implement the other aspects of the present invention. Base thirty-six encoding uses the standard numeric digits, 0 through 9, and the full range of lowercase alphabetic characters, a through z, to represent numeric values. Preferably, base ten numerals to be used in the HTTP request string are converted using a standard base conversion algorithm into base thirty-six numerals represented by the above described range of alphanumeric characters.

Preferred techniques for HTTP request compression can be illustrated using an example of an HTTP request that is added to a web page to access a preferred embodiment of the merchant link lookup table 240 as previously described. An example of such an HTTP request using base ten numeric values is the following:

<a href="http://www.cj.com/track/track.dll?AID=46655&PID=1679626">

As previously described, this HTTP request dynamically accesses the merchant link lookup table 240 and redirects a web browser 18 to a dynamically determined destination URL 248 after running the www.cj.com/track/track.dll program with the AID 250 and PID name-value pairs as parameters. In a preferred method, the base ten numeric values for the AID and PID in HTTP requests such as the one shown above are encoded into base thirty-six values before the request is added to a web page's content in order to reduce the number of digits necessary to represent the values.

Encoding the above AID and PID base ten numeric values using the preferred method of compression as described results in the following modified HTTP request:

<a href="http://www.cj.com/track/track.dll?AID=zzz&PID=1000a">

Converting the AID base ten value of 46655 to its base thirty-six equivalent of zzz results in a reduction of the AID value by two characters. Converting the PID from its base ten value of 1679626 to its base thirty-six equivalent of 1000a results in a reduction of the PID value by two characters. Use of the preferred method for HTTP request compression described above therefore reduces the overall number of characters required for the HTTP request by four. Preferably, the request compression is performed on all HTTP requests used in web pages to implement all of the aspects of the present invention as described.

In certain embodiments, communications among the central linking web site 380, merchant web sites 370 and affiliate web sites 390 (see FIG. 6) are carried out indirectly using the user system browser 362 as the primary intermediary. In one aspect, in such embodiments the system 350 may be viewed as being driven by requests generated from the user system browser 362, which result from accessing an affiliate web site 390 or from clicking through to and/or making a purchase from a merchant web site 370. The affiliate web site 390, merchant web site 370, and central linking web site 380 in such embodiments only communicate with the user system browser 362, not with each other. Cookies (i.e., small data records stored on the user web browser 362) may also be used to pass, retrieve, and store various data elements used as input to the processing of information relating to the central linking web site 380.

Details regarding embodiments of systems or methods for providing certain system features will now be described. In particular, further details are provided regarding image request processing, click-through processing and sales/lead processing, with reference to various concepts as described earlier herein.

Image request processing generally involves presentation of content (e.g., a banner advertisement) retrieved by use of the dynamic lookup table 383. In one embodiment, in response to a request from a user system browser 362 for an affiliate's web page 393, the affiliate web server 391 responds by returning an HTML web page 393 to the user system browser 362. Assuming the web page 393 is comprised of HTML code, then an <img src=""> tag is preferably included, the purpose of which is to cause the user system browser 362 to generate an HTTP request to the central linking web site server 381 to retrieve the banner or other content file uniquely identified by index information (e.g.; an ad ID (AID)) included as part of the HTTP request. An example of such an HTTP request is the following: http://www.cj.com/banners/tracker.exe?PID=xxxx&AID=xxxx Along with the AID designating which content file (e.g., merchant banner) to retrieve, the HTTP request to the central linking web site server 381 also includes a PID, which is a unique key used to identify the affiliate web site 390 from which the presentation request originated. An application program at central linking web site 380 logs the request for the specified AID and PID variables, and locates the content file (e.g., merchant banner) to be returned to the user system browser 362 using the AID. The central linking web site server 381 returns the merchant banner or other image or content in response to the request, and preferably writes one or more cookies to the user system browser 362 using a tracking domain name, with the cookies expiring after a predetermined amount of time (e.g., five years). The cookies are used to store impression data such as the AID, CID (company or merchant ID) and a time stamp.

For click-through processing, when a user clicks on a merchant banner or text link displayed by the user system browser 362 from an affiliate web page 393, a request is generated from the user system browser 362 to a central tracking application program (which may be one of the application programs 382) which preferably incorporates as part of the request any existing cookies from the user system browser 362 for the domain name used in the tracking request, and various parameters such as the AID and PID. The central tracking application program then preferably responds by writing cookies to the user system browser 362 and sending a redirect directive which includes all variables originally passed to the tracking domain on the initial click through. The user system browser 362 sends the new request specified in the redirect to the designated domain of the central linking web site server 381, including all cookies for that domain in the request header.

After various cookies are evaluated and updated (to validate time stamps, browser ids, etc.) by the application program, a redirect to the merchant's universal resource locator (URL) is sent to the user system browser 362 to connect to the merchant web site 370. The merchant URL can either be passed as part of the original request, or alternatively can be retrieved from the application program 382 based on the passed AID value. The user system browser 362 then sends a request to the merchant web site 370 and a merchant web page 371 is loaded into the user system browser 362 for display to the user.

Sales/lead processing may be accomplished in various embodiments as follows. In order to credit affiliates for sales or leads to merchants resulting from click-throughs from affiliates' web pages 393, merchants may generally include an embedded HTML tag in their order confirmation web page (or similarly functioning web page), which causes a user system browser 362 to send a request to the central tracking application program at the central linking web site 380 for the purpose of tracking the transaction. The request preferably contains parameters that define the transaction, which may be passed in name-value pairs within the request. The request may include the AID, PID, and CID, along with further information, if desired, such as a transaction type (sale or lead), an amount of the sale or lead, and an order identification code generated by the merchant. The user's cookies that exist in the tracking domain of the request are preferably sent in the request header. The central tracking application program checks the cookies contained in the request header to locate a cookie containing an AID along with the PID of the referring affiliate, and logs a sale if these parameters are found.

To validate the transaction, the central tracking application program may require that the AID and CID be related (i.e., that the ad designated by the AID belongs to the company designated by the CID). Once the tracking server validates a sale/lead request from a user system 362 browser, a response is sent back to the user system 360 containing either a redirect directive or an image, depending on, e.g., a method type parameter passed in the original request.

It should be noted that, while the foregoing description of FIG. 6 and other embodiments have been described in context of "merchant" and "affiliate" web sites and/or links, the same principles apply to other types of web sites and links. Therefore, the scope of the present invention is by no means limited to a merchant-affiliate system.

The above description of this invention is directed primarily to the preferred embodiment and practices thereof. While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A method for inserting a web page source code into a designated web page to display a dynamically retrieved web page content based on the execution of the web page source code, the method comprising the steps of:

selecting a portion of the designated web page where the dynamically retrieved web page content will be displayed;

embedding a dynamic content code and a dynamic content host server code into the designated web page;

accessing a host web server based upon the dynamic content host server code;

retrieving the web page source code from the host web server based on the dynamic content code;

inserting the web page source code from the host web server into the designated web page based upon the dynamic content code;

executing the web page source code inserted into the designated web page; and displaying the dynamically retrieved web page content on the portion of the designated web page, wherein the dynamic content code includes a program, file name and an identification code, wherein the dynamically retrieved web, page content is defined and controlled by at least one content display attribute that is accessed based upon the dynamic content code, and wherein the dynamically retrieved web page content is varied according to a content modification level display attribute.

2. A method for inserting a web page source code into a designated web page to display a dynamically retrieved web page content based on the execution of the web page source code, the method comprising the steps of:

- selecting a portion of the designated web page where the dynamically retrieved web page content will be displayed;
- embedding a dynamic content code and a dynamic content host server code into the designated web page;
- accessing a host web server based upon the dynamic content host server code;
- retrieving the web page source code from the host web server based on the dynamic content code;
- inserting the web page source code from the host web server into the designated web page based upon the dynamic content code;
- executing the web page source code inserted into the designated web page; and
- displaying the dynamically retrieved web page content on the portion of the designated web page,
- wherein the dynamic content code includes a program, file name and an identification code,
- wherein the dynamically retrieved web, page content is defined and controlled by at least one content display attribute that is accessed based upon the dynamic content code,
- wherein the dynamically retrieved web page content includes a static content and a run-time modified content, and
- wherein the dynamically retrieved web page content is varied according to a content modification level display attribute associated with the identification code.

3. A method for inserting a web page source code into a designated web page to display a dynamically retrieved web page content based on the execution of the web page source code, the method comprising the steps of:

- selecting a portion of the designated web page where the dynamically retrieved web page content will be displayed;
- embedding a dynamic content code and a dynamic content host server code into the designated web page;
- accessing a host web server based upon the dynamic content host server code;
- retrieving the web page source code from the host web server based on the dynamic content code;
- inserting the web page source code from the host web server into the designated web page based upon the dynamic content code;
- executing the web page source code inserted into the designated web page; and
- displaying the dynamically retrieved web page content on the portion of the designated web page,
- wherein the dynamic content code includes a program, file name and an identification code,
- wherein the dynamically retrieved web, page content is defined and controlled by at least one content display attribute that is accessed based upon the dynamic content code, and
- wherein the dynamically retrieved web page content includes a run-time modified content.

4. A method for inserting a web page source code into a designated web page to display a dynamically retrieved web page content based on the execution of the web page source code, the method comprising the steps of:

- selecting a portion of the designated web page where the dynamically retrieved web page content will be displayed;
- embedding a dynamic content code and a dynamic content host server code into the designated web page;
- accessing a host web server based upon the dynamic content host server code;
- retrieving the web page source code from the host web server based on the dynamic content code;
- inserting the web page source code from the host web server into the designated web page based upon the dynamic content code;
- executing the web page source code inserted into the designated web page; and
- displaying the dynamically retrieved web page content on the portion of the designated web page;
- accessing a plurality of content display attributes associated with the dynamically retrieved web page content;
- generating the web page with the dynamically retrieved web page content in response to a request from a client computer to a host web server over a distributed computer network; and
- displaying the web page with the dynamically retrieved web page content on the client computer based upon the plurality of content display attributes,
- wherein the request is sent to the host web server based upon the dynamic content host server code embedded within the web page,
- wherein the host web server executes a program file to retrieve the web page source code,
- wherein the program file utilizes an identification code sent with the request from the client computer to retrieve the web page source code,
- wherein the dynamically retrieved web page content is retrieved based on the file identifier contained in the web page source code, and
- wherein the dynamically retrieved web page content is varied according to at least one content modification level.

5. A method as recited in claim 4, wherein the dynamically retrieved web page content includes a static content and a run-time modified content.

6. A method as recited in claim 5, wherein the static content is varied according to a content modification level associated with the identification code.

7. A computer-implemented system operated over a distributed electronic network for inserting a web page source code containing a file identifier into a designated web page to display a dynamically retrieved web page content on a portion of the designated web page, the system comprising:

a) a means for retrieving and inserting the web page source code into the designated web page based on a dynamic content code, executing the web page source code, retrieving the dynamically retrieved web page content based on the file identifier contained in the web page source code, and displaying the web page with the dynamically retrieved web page content;

b) a host web server computer system to process requests for web page source code and dynamically retrieved web page content, the system comprising:

i) a means for storing web page source code;

ii) a means for storing dynamically retrieved web page content;

iii) a data processor for inserting a web page source code into a designated web page based on a dynamic content code, and retrieving a dynamically retrieved web page content based on a file identifier contained in the web page source code, wherein the dynamically retrieved web page content is defined and controlled by at least one content display attribute that is accessed based upon the dynamic content code, and wherein the dynamically retrieved web page content is varied according to a content modification level display attribute.

8. A computer-implemented system operated over a distributed electronic network for inserting a web page source code containing a file identifier into a designated web page to display a dynamically retrieved web page content on a portion of the designated web page, the system comprising:

a) a means for retrieving and inserting the web page source code into the designated web page based on a dynamic content code, executing the web page source code, retrieving the dynamically retrieved web page content based on the file identifier contained in the web page source code, and displaying the web page with the dynamically retrieved web page content;

b) a host web server computer system to process requests for web page source code and dynamically retrieved web page content, the system comprising:
  i) a means for storing web page source code;
  ii) a means for storing dynamically retrieved web page content;
  iii) a data processor for inserting a web page source code into a designated web page based on a dynamic content code, and retrieving a dynamically retrieved web page content based on a file identifier contained in the web page source code, wherein the dynamically retrieved web page content is defined and controlled by at least one content display attribute that is accessed based upon the dynamic content code, wherein the dynamically retrieved web page content includes a static content and a run-time modified content, and wherein the dynamically retrieved web page content is varied according to a content modification level display attribute associated with the identification code.

9. A computer-implemented system operated over a distributed electronic network for inserting a web page source code containing a file identifier into a designated web page to display a dynamically retrieved web page content on a portion of the designated web page, the system comprising:

a) a means for retrieving and inserting the web page source code into the designated web page based on a dynamic content code, executing the web page source code, retrieving the dynamically retrieved web page content based on the file identifier contained in the web page source code, and displaying the web page with the dynamically retrieved web page content;

b) a host web server computer system to process requests for web page source code and dynamically retrieved web page content, the system comprising:
  i) a means for storing web page source code;
  ii) a means for storing dynamically retrieved web page content;
  iii) a data processor for inserting a web page source code into a designated web page based on a dynamic content code, and retrieving a dynamically retrieved web page content based on a file identifier contained in the web page source code, wherein the dynamically retrieved web page content is defined and controlled by at least one content display attribute that is accessed based upon the dynamic content code, wherein the dynamically retrieved web page content includes a run-time modified content, and wherein the run-time modified content is not varied according to a content modification level associated with the identification code.

10. A computer readable medium having stored therein one or more sequences of instructions for inserting a web page source code containing a file identifier into a designated web page based on a dynamic content code, and for displaying a dynamically retrieved web page content based on the execution of the web page source code, the one or more sequences of instructions causing one or more processors to perform a plurality of acts, said acts comprising:

allowing the dynamically retrieved web page content to be stored on a host web server based on a dynamic content code;

allowing the web page source code to be stored on the host web server;

retrieving the dynamically retrieved web page content from the host web server based on the execution of the web page source code containing the file identifier contained in the designated web page;

inserting the dynamically retrieved web page content from the host web server into the designated web page; and returning the web page containing the dynamically retrieved web page content for display on a client computer system, wherein the dynamic content code includes a program file name and an identification code, wherein the dynamically retrieved web page content is defined and controlled by at least one content display attribute that is accessed based upon the dynamic content code, and wherein the dynamically retrieved web page content is varied according to a content modification level display attribute.

11. A computer readable medium having stored therein one or more sequences of instructions for inserting a web page source code containing a file identifier into a designated web page based on a dynamic content code, and for displaying a dynamically retrieved web page content based on the execution of the web page source code, the one or more sequences of instructions causing one or more processors to perform a plurality of acts, said acts comprising:

allowing the dynamically retrieved web page content to be stored on a host web server based on a dynamic content code;

allowing the web page source code to be stored on the host web server;

retrieving the dynamically retrieved web page content from the host web server based on the execution of the web page source code containing the file identifier contained in the designated web page;

inserting the dynamically retrieved web page content from the host web server into the designated web page; and returning the web page containing the dynamically retrieved web page content for display on a client computer system, wherein the dynamic content code includes a program file name and an identification code, wherein the dynamically retrieved web page content is defined and controlled by at least one content display attribute that is accessed based upon the dynamic content code, wherein the dynamically retrieved web page content includes a static content and a run-time modified content, and wherein the dynamically retrieved web page content is varied according to a content modification level display attribute associated with the identification code.

12. A computer readable medium having stored therein one or more sequences of instructions for inserting a web page source code containing a file identifier into a designated web page based on a dynamic content code, and for displaying a dynamically retrieved web page content based on the execution of the web page source code, the one or more sequences of instructions causing one or more processors to perform a plurality of acts, said acts comprising:

allowing the dynamically retrieved web page content to be stored on a host web server based on a dynamic content code;

allowing the web page source code to be stored on the host web server;

retrieving the dynamically retrieved web page content from the host web server based on the execution of the web page source code containing the file identifier contained in the designated web page;

inserting the dynamically retrieved web page content from the host web server into the designated web page; and returning the web page containing the dynamically retrieved web page content for display on a client computer system, wherein the dynamic content code includes a program file name and an identification code, wherein the dynamically retrieved web page content is defined and controlled by at least one content display attribute that is accessed based upon the dynamic content code, wherein the dynamically retrieved web page content includes a run-time modified content, and wherein the run-time modified content is not varied according to a content modification level associated with the identification code.

\* \* \* \* \*